(12) United States Patent
Yanagisawa et al.

(10) Patent No.: US 8,385,458 B2
(45) Date of Patent: Feb. 26, 2013

(54) SIGNAL PROCESSING CIRCUIT AND SIGNAL PROCESSING METHOD

(75) Inventors: Kiyoshi Yanagisawa, Minato-ku (JP); Noriaki Matsuno, Minato-ku (JP)

(73) Assignee: NEC Corporation, Tokyo (JP)

( * ) Notice: Subject to any disclaimer, the term of this patent is extended or adjusted under 35 U.S.C. 154(b) by 918 days.

(21) Appl. No.: 12/376,415

(22) PCT Filed: Jul. 11, 2007

(86) PCT No.: PCT/JP2007/063805
§ 371 (c)(1),
(2), (4) Date: Feb. 4, 2009

(87) PCT Pub. No.: WO2008/018263
PCT Pub. Date: Feb. 14, 2008

(65) Prior Publication Data
US 2010/0195706 A1    Aug. 5, 2010

(30) Foreign Application Priority Data

Aug. 8, 2006    (JP) ................................. 2006-215596

(51) Int. Cl.
*H04L 27/00*    (2006.01)
(52) U.S. Cl. ........................................ 375/295; 375/285
(58) Field of Classification Search .......... 375/295–315, 375/285
See application file for complete search history.

(56) References Cited

U.S. PATENT DOCUMENTS 7,555,272 B2 *   6/2009   Boos .............................. 375/297
2004/0165678 A1 *   8/2004   Nadiri ........................... 375/296

FOREIGN PATENT DOCUMENTS

| JP | 5-68060 A | 3/1993 |
|---|---|---|
| JP | 6-350658 A | 12/1994 |
| JP | 8-213846 A | 8/1996 |
| JP | 9-504673 A | 5/1997 |
| JP | 2004-274288 A | 9/2001 |
| JP | 2001-339452 A | 12/2001 |
| JP | 2002-252663 A | 9/2002 |
| JP | 2004-7083 A | 1/2004 |

(Continued)

*Primary Examiner* — Sam K Ahn
*Assistant Examiner* — Janice Tieu
(74) *Attorney, Agent, or Firm* — Sughrue Mion, PLLC

(57) ABSTRACT

A signal processing circuit for compensating for an I/Q amplitude mismatch in which the amplitudes of I- and Q-components of output signals of a quadrature modulator are unequal to or for compensating for an I/Q phase mismatch in which the phase difference between the I- and the Q-components of output signals of the quadrature modulator deviates from 90 degrees. The signal processing circuit comprises an I/Q mismatch compensating part that corrects the amplitude or phase of an input signal based on the compensation amount for compensating for an I/Q amplitude mismatch or an I/Q phase mismatch and that inputs the corrected signal into a quadrature modulator; a test signal generating part that sequentially generates and inputs two sets of combined I- and Q-components of a test signal, which is an AC signal, to the I/Q mismatch compensating part; a detector that determines an amplitude of the envelope of an output signal of the quadrature modulator; a filter that passes those ones of output signals of the detector which have frequencies equal to or lower than a cutoff frequency; and a control part that derives an amplitude or phase compensation amount of the I/Q mismatch compensating part such that the output values of the filter at the time of generating the two respective sets of test signals are equal to each other, the control part then inputting the derived amplitude or phase compensation amount into the I/Q mismatch compensating part.

13 Claims, 30 Drawing Sheets

| | FOREIGN PATENT DOCUMENTS | | | WO | 03/101061 A1 | 12/2003 |
|---|---|---|---|---|---|---|
| JP | 2004-509555 A | 3/2004 | | | | |
| JP | 2004-363757 A | 12/2004 | | * cited by examiner | | |

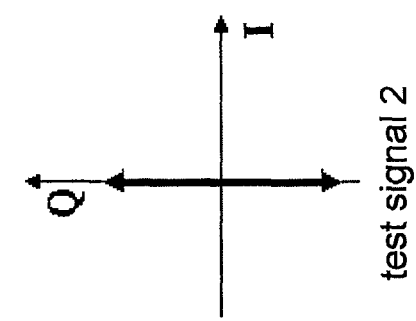
Fig.16
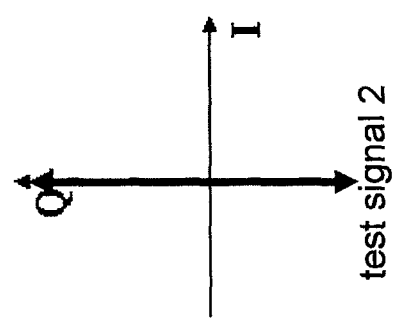
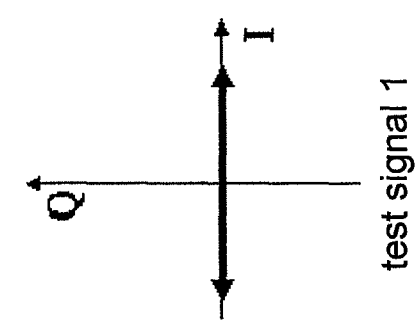
Fig.17
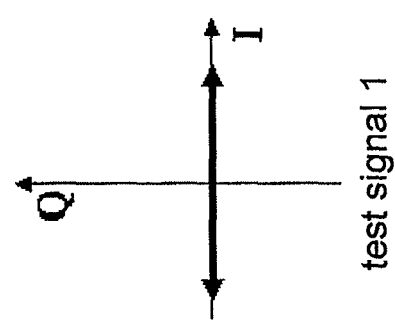

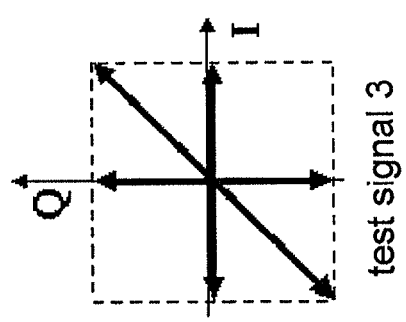
Fig.21
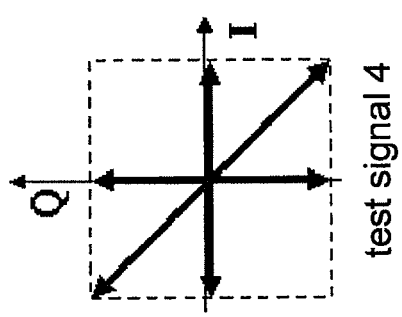
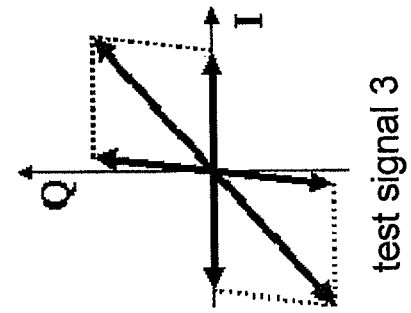
Fig.22
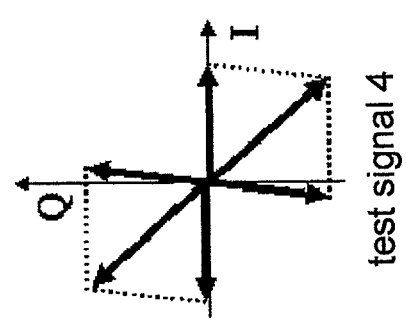

SIGNAL PROCESSING CIRCUIT AND SIGNAL PROCESSING METHOD

This application is based on and claims the benefit of priority from Japanese Patent Application No. 2006-215596 filed Aug. 8, 2006, the disclosure of which is incorporated herein by reference in its entirety.

TECHNICAL FIELD

The present invention relates to a signal processing circuit disposed in a transmitter for quadrature modulating a transmission baseband signal including an I (in-phase) component/an Q (quadrature) component, and more particularly, to techniques for improving the modulation accuracy of quadrature modulation.

BACKGROUND ART

In this type of signal processing circuit, suppression of carrier leak and prevention of degradation in modulation accuracy in a quadrature modulator constitute essential performance for ensuring communication quality and for observing the law.

Here, the carrier leak corresponds to a DC offset (DC offset) of I/Q-components in terms of an input of a quadrature modulator. Factors which affect the modulation accuracy of the quadrature modulator include the carrier leak, variations in level between I/Q-components (a factor of an I/Q mismatch, later described) in terms of an input of the quadrature modulator, and the quadrature nature of a local signal applied to the quadrature modulator, i.e., variations in amplitude and phase difference between the I/Q-components (a factor of the I/Q mismatch, later described).

In recent years, however, although a transmitter is required to provide higher performance in connection with increasingly faster communications, the above-mentioned performance rather tends to degrade due to constraints on circuit configuration resulting from the transition of the architecture toward direct conversion, and a reduction in voltages of the processes.

Accordingly, a signal processing circuit is essentially provided with means for compensating a quadrature modulator for a DC offset and I/Q mismatches (I/Q amplitude mismatch and I/Q phase mismatch).

Here, the I/Q amplitude mismatch refers to a mismatch in amplitude of I/Q-components of an output signal from a quadrature modulator. As factors which cause the I/Q amplitude mismatch, the following three factors may be contemplated: (1) a mismatch in amplitude between I/Q-components of a local signal applied to the quadrature modulator; (2) a mismatch in amplitude between I/Q-components of a transmission baseband signal applied to the quadrature modulator; and (3) a mismatch in gain between a path associated with the I-component and a path associated with the Q-component within the quadrature modulator.

The I/Q phase mismatch, in turn, refers to a deviation of a phase difference from 90 degrees between I/Q-components of an output signal from a quadrature modulator. As factors which cause the I/Q phase mismatch, the following three factors may be contemplated: (1) a deviation of a phase difference from 90 degrees between I/Q-components of a local signal applied to the quadrature modulator; (2) a deviation of a phase difference from 90 degrees between I/Q-components of a transmission baseband signal applied to the quadrature modulator; and (3) a deviation of the phase on paths associated with the I-component and Q-component within the quadrature modulato.

A number of signal processing circuits have been proposed in the past with means for compensating a quadrature modulator for a DC offset and I/Q mismatches, but ideally, hardware added for compensation is closest possible to zero. In this respect, conventional signal processing circuits still have room for improvements.

FIG. 1 is a diagram showing an exemplary configuration of a conventional signal processing circuit.

Referring to FIG. 1, the signal processing circuit of this conventional example comprises transmission BB (baseband) signal generating part 11; test signal generating part 12; switch 13 labeled SW; DC offset and I/Q mismatch compensating part 14; DA converter 15 labeled DAC; quadrature modulator 16; envelope detector 17; AD converter 18 labeled ADC; and compensation amount generating part 19.

Transmission BB signal generating part 11 generates a transmission baseband signal in a transmission operation.

Test signal generating part 12 generates a test signal in a compensation operation.

Switch 13 selects the test signal generated by test signal generating part 12 in a compensation operation, and selects the transmission baseband signal generated by transmission BB signal generating part 11 in a transmission operation.

DC offset and I/Q mismatch compensating part 14 corrects a signal selected by switch 13 based on the compensation amount which has been set by compensation amount generating part 19. In this regard, the compensation amount is set in a compensation operation.

DA converter 15 D/A converts I/Q-components of the signal corrected by DC offset and I/Q mismatch compensating part 14 from digital signals to analog signals.

Quadrature modulator 16 mixes I/Q-components of the signal D/A converted by DA converter 15 with I/Q-components of a local signal, respectively for up-conversion, and adds I/Q-components of the up-converted signals to each other. An RF signal, which has been quadrature modulated in this way, is output from the signal processing circuit.

Envelop detector 17 detects the amplitude of an envelope (envelope) of an output signal of quadrature modulator 16.

AD converter 18 ND converts the output signal of envelope detector 17 from an analog signal to a digital signal.

Compensation amount generating part 19 generates a compensation amount for compensating quadrature modulator 16 for a DC offset and I/Q mismatches, based on the digital signal ND converted by AD converter 18, and sets the compensation amount in DC offset and I/Q mismatch compensating part 14.

In the following, a description will be given of the operation of the signal processing circuit of this conventional example.

In a compensation operation, switch 13 selects a test signal generated by test signal generating part 12. This test signal is applied to a baseband port of quadrature modulator 16 through DC offset and I/Q mismatch compensating part 14 and DA converter 15 for performing quadrature modulation. Envelope detector 17 detects the amplitude of the thus quadrature modulated signal, and AD converter 18 converts the detected amplitude to a digital signal. Compensation amount generating part 19 generates a compensation amount based on this digital signal.

FIG. 2 is a diagram showing a typical test signal used to compensate quadrature modulator 16. The test signal typically has an I-component which is a cos wave and a Q-component which is a sine wave.

FIG. 3 is a diagram showing the constellation of an output signal from quadrature modulator 16 which is in an ideal state. An ideal state for quadrature modulator 16 refers to a state in which either the I-component or Q-component does not suffer from a DC offset, and quadrature modulator 16 does not suffer from either an I/Q amplitude mismatch or an I/Q phase mismatch. In this event, the constellation draws a true circle centered at the origin. Accordingly, quadrature modulator 16 generates an output signal, the envelope of which is a sine wave of a regular envelope.

FIG. 4 shows the constellation of an output signal from quadrature modulator 16 which presents a DC offset. In this event, the constellation draws a circle, the center of which shifts from the origin. Accordingly, the envelop of the output signal from quadrature modulator 16 increases and decreases over time.

FIG. 5 is a diagram showing the constellation of an output signal from quadrature modulator 16 which presents an I/Q amplitude mismatch, and FIG. 6 is a diagram showing the constellation of an output signal from quadrature modulator 16 which presents an I/Q phase mismatch. In either case, the envelope of the output signal from quadrature modulator 16 increases and decreases over time.

Compensation amount generating part 19 matches the cycle and phase of the output signal from quadrature modulator 16, the envelope of which increases and decreases, with the phase and frequency of the test signal to confirm how much a DC offset, an I/Q amplitude mismatch, and an I/Q phase mismatch exist in quadrature modulator 16, and generates a compensation amount which is set in DC offset and I/Q mismatch compensating part 14.

On the other hand, in a transmission operation, switch 13 selects a transmission baseband signal generated by transmission BB signal generating part 11. This transmission baseband signal is applied to DC offset and I/Q mismatch compensating part 14, and is corrected on the basis of the previously set compensation amount. The corrected signal is applied to a baseband port of quadrature modulator 16 through DA converter 15 to perform a quadrature modulation. The signal, which has been quadrature modulated in this way, is an output signal of the signal processing circuit.

As a document which discloses a technique similar to the foregoing, there is Patent Document 1. This Patent Document 1 discloses a method of compensating a quadrature modulator for an I/Q phase mismatch using a test signal which comprises only two points in the first quadrant to the fourth quadrant on the I/Q quadrature coordinates. According to this method, the test signal is simplified.

As another document which discloses a technique similar to the foregoing, there is Patent Document 2. Patent Document 2 discloses a method of performing a compensation operation with a sinusoidal test signal applied to a baseband port of a quadrature modulator.

As another document which discloses a technique similar to the foregoing, there is Patent Document 3. Patent Document 3 discloses a method of improving the accuracy of a quadrature modulator based on a signal which is generated by frequency converting transmission data by an I/Q quadrature down converter.

As well, Patent Documents 4~9 are presented as documents which disclose techniques similar to the foregoing.

However, the foregoing related techniques imply problems described below.

The related techniques described in conjunction with FIGS. 1 through 6 have a problem in that a large ROM area is required to store waveform data of a test signal because the test signal is a smooth sinusoidal wave. They also has a problem in that an AD converter is required to A/D convert the output of an envelope detector.

In the related technique disclosed in Patent Document 1, since two points on the I/Q quadrature coordinates are used for a test signal, simplification of the test signal is implemented. However, a problem is that an AD converter is required to A/D convert the output of the envelope detector. Also, Patent Document 1 discloses only a method of compensating for an I/Q phase mismatch, but does not disclose a method of compensating for an I/Q amplitude mismatch. Also, to perform a compensation operation for I/Q phase mismatch using the method disclosed in Patent Document 1, it is necessary to suppress a DC offset in terms of a baseband input of the quadrature modulator, i.e., a carrier leak in terms of the output of the quadrature modulator to be sufficiently low, and to suppress an I/Q amplitude mismatch to be sufficiently low.

Here, the method disclosed in Patent Document 1 will be described in greater detail with reference to FIGS. 7 and 8. Consider herein an example in which the quadrature modulator is compensated for the I/Q phase mismatch using a test signal which comprises two points in the first quadrant and second quadrant on the I/Q quadrature coordinates.

FIG. 7 is a diagram showing an example of the test signal at two points for use in a compensation operation for the quadrature modulator. Assume herein that the quadrature modulator does not suffer at all from either a DC offset, or an I/Q phase mismatch, or an I/Q amplitude mismatch. In FIG. 7 point 5 is a point in the first quadrant, and point 6 is a point in the second quadrant.

According to the method disclosed in Patent Document 1, the distance from the origin to point 5 and the distance from the origin to point 6 are found by detecting the amplitude of the envelope of the output signal from the quadrature modulator, and the condition under which these distances become equal is found as a condition under which no I/Q phase mismatch exists. In the example shown in FIG. 7, obviously, the method disclosed in Patent Document 1 correctly functions.

However, a DC offset in terms of an input exists without exception in the quadrature modulator due to a problem of its manufacturing accuracy of the quadrature modulator.

FIG. 8 is a diagram showing an example of the test signal at two points for use in a compensation operation for the quadrature modulator when a DC offset exists in the quadrature modulator. Again, assume herein that the quadrature modulator does not suffer at all from either an I/Q phase mismatch or an I/Q amplitude mismatch.

The example of FIG. 8 differs from the example of FIG. 7 in that a positive DC offset occurs in an I-component, and a negative DC offset occurs in a Q-component. Consequently, even if there is no input to the quadrature modulator, a comparable carrier leak occurs at point 0'. Due to this DC offset, point 5 and point 6 for use in a compensation operation shift to point 5' and point 6', respectively, in a lower right direction.

According to the method disclosed in Patent Document 1, the distance from the origin to point 5' and the distance from the origin to point 6' are found by detecting the envelop of the output signal from the quadrature detector, and the condition under which these distances become equal is found as the condition under which no I/Q phase mismatch exists.

However, according to the example of FIG. 8, the distance from the origin to point 5' is obviously longer than the distance from the origin to point 6' in spite of the absence of I/Q phase mismatch. In other words, the method disclosed in Patent Document 1 does not function correctly when a DC offset exists in the quadrature modulator.

Also, even supposing that a condition is found in the example of FIG. 7 under which the distance from the origin to point 5 is equal to the distance from the origin to point 6, the I/Q amplitude mismatch amount must be known in order to find the I/Q phase mismatch amount as an angle or its sinusoidal function value based on the amplitudes of the I-component and Q-component of the test signal at that time. In other words, in order to know two unknown amounts which are the I/Q amplitude mismatch amount and I/Q phase mismatch amount, another equation is required due to insufficiency of a single equation which represents the distance from the origin to point 5 that is equal to the distance from the origin to point 6. Actually, the equation disclosed in Patent Document 1 does not take into consideration the influence of the I/Q amplitude mismatch.

Assume herein that when two points (I,Q)=(1.05, 1.00) and (−0.95, 1.00) are applied to the quadrature modulator as the test signal, outputs signals of the quadrature modulator are equal in signal strength. Assume also a situation where an I/Q amplitude mismatch is present to cause the amplitude of the I-component to be k-times higher than the amplitude of the Q-component. In this event, the following Equation 1 is established when an I/Q phase mismatch amount is represented by X:

$$(1.00 \cos X)^2 + (1.05k + 1.00 \sin X)^2 = (1.00 \cos X)^2 + (0.95k + 1.00 \sin X)^2 \quad \text{[Equation 1]}$$

Thus, it is obviously understood that I/Q phase mismatch amount X cannot be found unless k is previously known.

As a method of avoiding this problem, there is a method which is thought to remove the DC offset and I/Q amplitude mismatch of the quadrature modulator using another conventional technique before executing the method disclosed in Patent Document 1.

In reality, however, it is common to employ a DA converter for compensating for a DC offset. Nevertheless, when a DA converter is employed, a certain amount of DC offset inevitably remains due to the problem of resolution of the DA converter. In addition, relatively large values, i.e., −15 dB ∼ −20 dB, are allowed for the amount of carrier leak that is allowed for a normal radio communication system, i.e., the value of a DC offset in terms of the baseband input of the quadrature modulator, with respect to a total transmission power. Accordingly, to use the method disclosed in Patent Document 1, the DC offset must be removed at an accuracy significantly more strict as compared with the amount of DC offset allowed for the radio communication system, resulting in a more complicated implementation.

Further, in a transmitter which employs a modulation scheme which does not use frequency near DC such as an OFDM system, an AC coupling is often used for coupling of a quadrature modulator with a DA converter in order to reduce a DC offset and low frequency component noise. When AC coupling exists, signals deteriorate because many DC components are included in the waveform of the test signal in the method disclosed in Patent Document 1. As a result, the method disclosed in Patent Document 1 does not correctly function.

The conventional technique disclosed in Patent Document 2 has a problem in that the configuration is more complicated, such as the need for a test signal generating part for generating a smooth sinusoidal test signal and an AD converter.

In addition to the problem in which the configuration is more complicated, the conventional technique disclosed in Patent Document 3 has a problem in that the I/Q accuracy and the like of an I/Q quadrature down converter for use in a compensation operation constitute causes for errors in the compensation operation. More specifically, to perform a compensation operation with high accuracy, an I/Q quadrature down converter is required to exhibit high I/Q accuracy. However, it can be said to be contradictory that while the compensation operation is performed due to the inability to manufacture a quadrature modulator having high modulation accuracy, an I/Q quadrature down converter having a high I/Q accuracy is required as a means therefor.

The conventional techniques disclosed in Patent Documents 4, 5 also have a problem in that the configuration is more complicated, such as the need for a test signal generating part, an AD converter and the like, as mentioned above, but Patent Documents 4, 5 do not disclose means for solving this problem.

In the conventional technique disclosed in Patent Document 6, four points are found on a phase plane, at which output signals from a quadrature modulator are equal in output intensities, to simultaneously find compensation amounts for an I/Q phase mismatch and a DC offset. However, even with this technique, an AD converter is required. It is also necessary to calculate the compensation amounts by solving quadruple simultaneous equations with 12 variables, described as Equation (6) in Patent Document 6, from data derived within the range of a limited resolution of an AD converter. Consequently, there is a problem in which hardware must be added in order to solve the quadruple simultaneous equations, and a problem in which the accuracy of the compensation amount exacerbates. Also, no solution is disclosed in Patent Document 6 for a problem in which an I/Q amplitude mismatch amount must be previously found.

In the conventional technique disclosed in Patent Document 7, the compensation amount for an I/Q amplitude mismatch is found from three pieces of information, the signal strength of each input signal of I/Q-components of a quadrature modulator, and the signal strength of an output signal from the quadrature modulator. However, this technique also requires an AD converter. Also, the influence of a DC offset and an I/Q phase mismatch that are exerted on the signal strength of the output signal from the quadrature modulator is not taken into consideration. For this reason, this technique correctly operates only when neither the DC offset nor I/Q amplitude mismatch exists.

In the conventional techniques disclosed in Patent Documents 8, 9, since a quadrature demodulator is used as a detection system in a compensation operation for I/Q phase mismatch and I/Q amplitude mismatch, a problem arises in which the accuracy of the quadrature demodulator can cause errors in the compensation operation. In other words, a quadrature demodulator having high I/Q accuracy and the like is required to perform a highly accurate compensation operation. However, it can be said to be contradictory that while the compensation operation is performed due to the inability to manufacture a quadrature modulator having a high modulation accuracy, a quadrature demodulator having high I/Q accuracy is required as a means therefor. Also, if a DC offset remains in the quadrature demodulator in the compensation operation for I/Q phase mismatch, this DC offset is reflected as an offset of a compensation amount for correcting a transmission baseband signal, thus leading to an increase in carrier leakage of the quadrature modulator. While a configuration may be contemplated to comprise means for compensating the quadrature demodulator to perform a compensation operation for the quadrature modulator after a compensation operation has been performed for the quadrature demodulator, Patent Documents 8, 9 do not disclose means for compensating the quadrature demodulator.

Also, in the conventional techniques disclosed in Patent Documents 8, 9, from the fact that a quadrature demodulator is employed as a detection system in a compensation operation, after output signals of I/Q-components from the quadrature demodulator have been converted to digital data by an AD converter, operational processing is performed to find an I/Q phase mismatch. Specifically, the compensation amount for an I/Q phase mismatch must be found from data which is made available within the range of a limited resolution of the AD converter, resulting in a problem of exacerbation in the accuracy of the resulting compensation amount. Patent Documents 8, 9 do not disclose a solution for this problem.

| Patent Document 1: | JP-2002-252663-A |
|---|---|
| Patent Document 2: | JP-08-213846-A |
| Patent Document 3: | JP-09-504673-A |
| Patent Document 4: | JP-2004-007083-A |
| Patent Document 5: | JP-2004-509555-A |
| Patent Document 6: | International Publication No. 2003/101061, Pamphlet |
| Patent Document 7: | JP-06-350658-A |
| Patent Document 8: | JP-2004-274288-A |
| Patent Document 9: | JP-2004-363757-A |

DISCLOSURE OF THE INVENTION

It is therefore an object of the present invention to provide a signal processing circuit and a signal processing method which are capable of highly accurately compensating a quadrature modulator for I/Q mismatches while avoiding more complexity of configuration.

To achieve the above object, a signal processing circuit of the present invention is a signal processing circuit for compensating a quadrature modulator for an I/Q amplitude mismatch which involves mismatching amplitudes of I/Q-components of an output signal from the quadrature modulator, and compensating a quadrature modulator for an I/Q phase mismatch which involves a deviation from 90 degrees of a phase difference between the I/Q-components of the output signal from the quadrature modulator, characterized by comprising:

an I/Q mismatch compensating part for correcting an input signal for amplitude or phase, based on a compensation amount for compensating for the I/Q amplitude mismatch or the I/Q phase mismatch, and applying the input signal with the corrected amplitude or phase to the quadrature modulator;

a test signal generating part for sequentially generating two sets of combinations of I/Q-components of test signals which are AC signals and applying the test signals to the I/Q mismatch compensating part;

a detector for detecting the amplitude of an envelope of an output signal from the quadrature modulator;

a filter for passing therethrough a signal at a cutoff frequency or lower within the output signal from the detector; and a control part for deriving the compensation amount for the amplitude or phase of the I/Q mismatch compensating part such that output values of the filter are equal when the two sets of test signals are respectively generated, and setting the compensation amount to the I/Q mismatch compensating part.

To achieve the above object, a signal processing method of the present invention is a signal processing method for compensating a quadrature modulator for an I/Q amplitude mismatch which involves mismatching amplitudes of I/Q-components of an output signal from the quadrature modulator, and compensating a quadrature modulator for an I/Q phase mismatch which involves a deviation from 90 degrees of a phase difference between the I/Q-components of the output signal from the quadrature modulator, characterized by:

an I/Q mismatch compensating part correcting an input signal for amplitude or phase, based on a compensation amount for compensating for the I/Q amplitude mismatch or the I/Q phase mismatch, and applying the input signal with the corrected amplitude or corrected phase to the quadrature modulator;

a test signal generating part sequentially generating two sets of combinations of I/Q-components of test signals which are AC signals and applying the test signals to the I/Q mismatch compensating part;

a detector detecting the amplitude of an envelope of an output signal from the quadrature modulator;

a filter passing therethrough a signal at a cutoff frequency or lower within the output signal from the detector; and a control part deriving a compensation amount for the amplitude or phase of the I/Q mismatch compensating part such that output values of the filter are equal when the two sets of test signals are respectively generated, and setting the compensation amount in the I/Q mismatch compensating part.

According to this configuration, the test signal generating part generates two sets of combinations of I/Q-components of test signals which are AC signals. In this event, the detector detects the amplitude of the envelope of the output signal of the quadrature modulator, and the filter passes therethrough low frequency components within the output signal of the detector. Then, the control part derives the compensation amount for the amplitude or phase of the I/Q mismatch compensating part such that output values of filter are equal when the two sets of test signals are respectively generated, and sets the compensation amount in the I/Q mismatch compensating part. It is therefore possible to highly accurately compensate for I/Q mismatches without being influenced by a DC offset.

Also, since simple AC signals are used for the two sets of test signals, the signals are not degraded even when a DA converter is AC coupled at a stage previous to the quadrature modulator, thus making it possible to highly accurately compensate for I/Q mismatches.

Also, since simple AC signals are used for the two sets of test signals, there will not be a large increase in the mounting cost, and the configuration having higher complexity can be avoided because a ROM area that is smaller will be sufficient for storing the test signals.

Also, since the compensation amount for the amplitude or phase of the I/Q mismatch compensating part is derived such that output values of the filter are equal when the two sets of the test signals are respectively generated, no AD converter need be used due to the fact that only the magnitude relationship between output values of the filter must be known.

BRIEF DESCRIPTION OF THE DRAWINGS

FIG. 16 is a diagram for describing test signals, when there is no I/Q amplitude mismatch, for use in the compensation operation for I/Q amplitude mismatch by the signal processing circuit shown in FIG. 10;

FIG. 17 is a diagram for describing test signals, when there is an I/Q amplitude mismatch, for use in the compensation operation for I/Q amplitude mismatch by the signal processing circuit shown in FIG. 10;

FIG. 21 is a diagram for describing test signals, when there is no I/Q phase mismatch, for use in the compensation operation for I/Q phase mismatch by the signal processing circuit shown in FIG. 10;

FIG. 22 is a diagram for describing test signals, when there is an I/Q phase mismatch, for use in the compensation operation for I/Q phase mismatch by the signal processing circuit shown in FIG. 10;

BEST MODE FOR CARRYING OUT THE INVENTION

Figure 1:
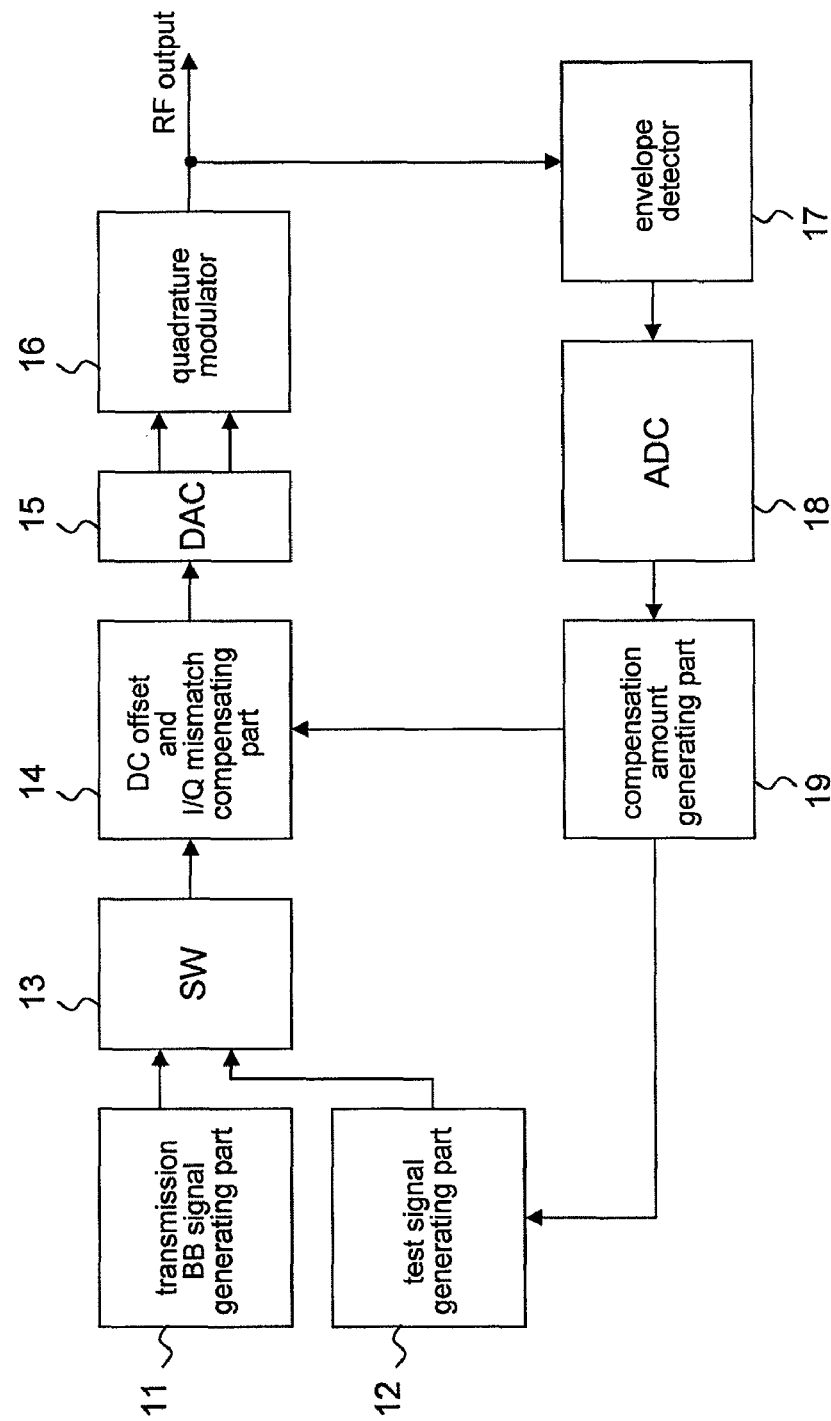
FIG. 1 is a block diagram showing an example of the whole configuration of a conventional signal processing circuit.
Figure 2:
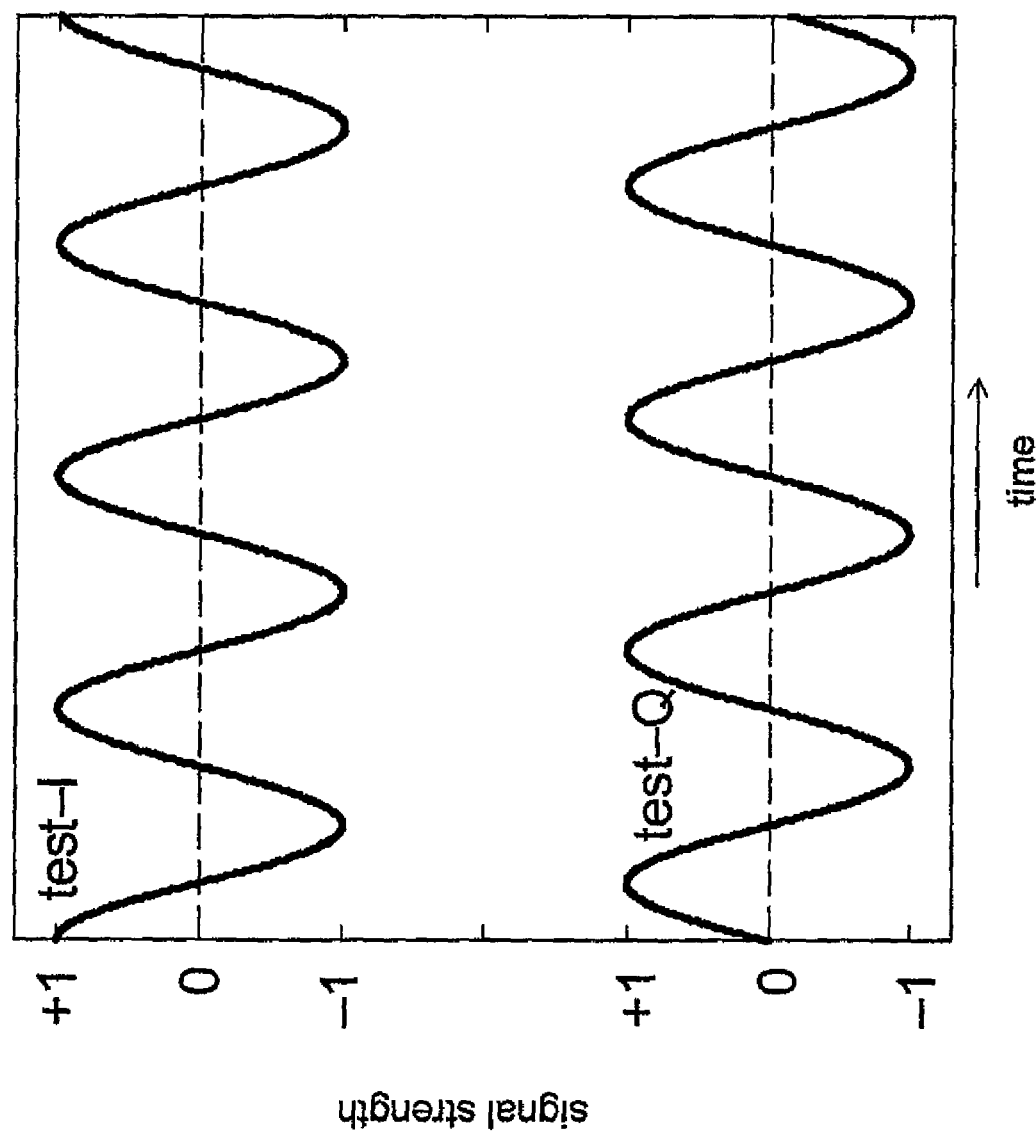
FIG. 2 is a diagram showing a typical test signal for use in a compensation operation for a conventional quadrature modulator.
Figure 3:
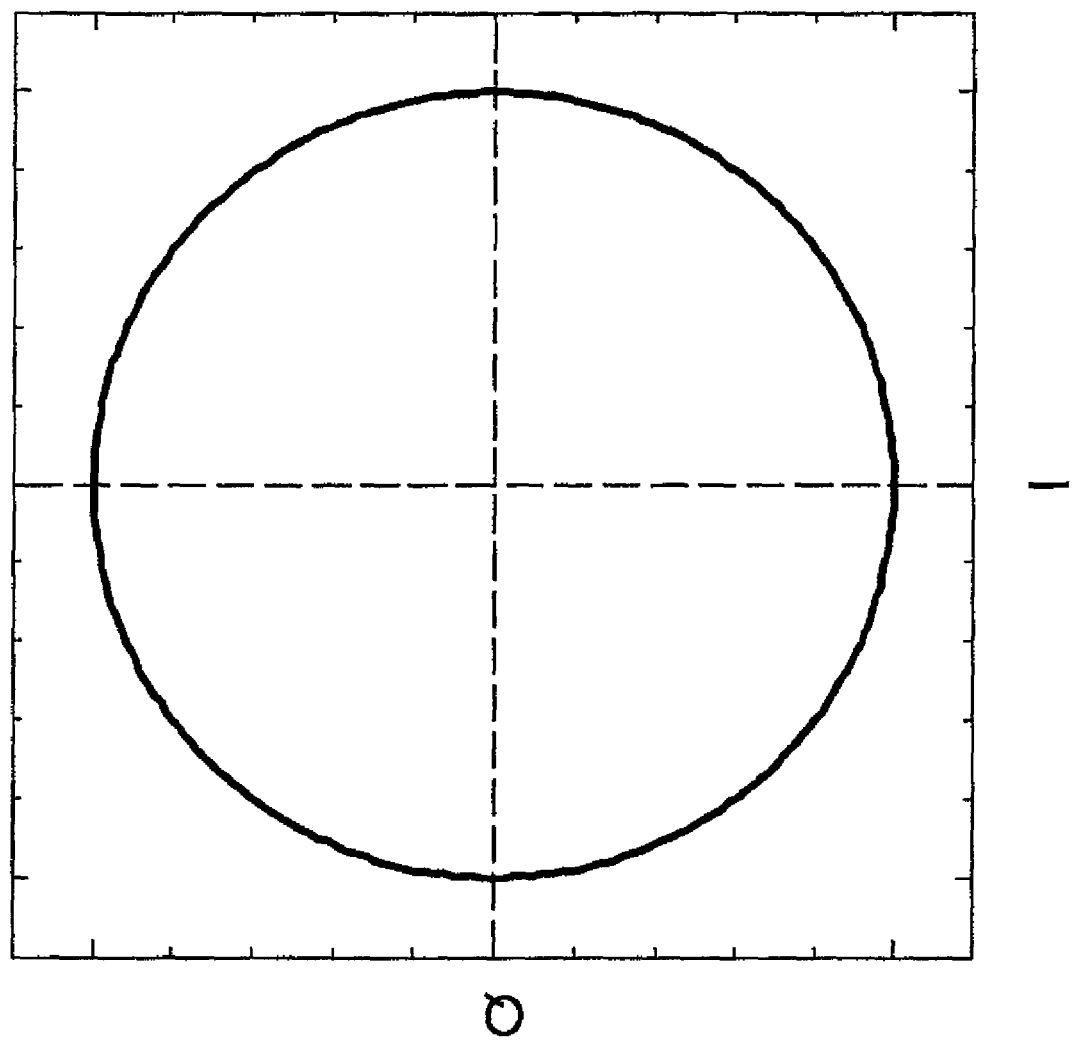
FIG. 3 is a diagram showing the constellation of an output signal from a quadrature modulator in an ideal state.
Figure 4:
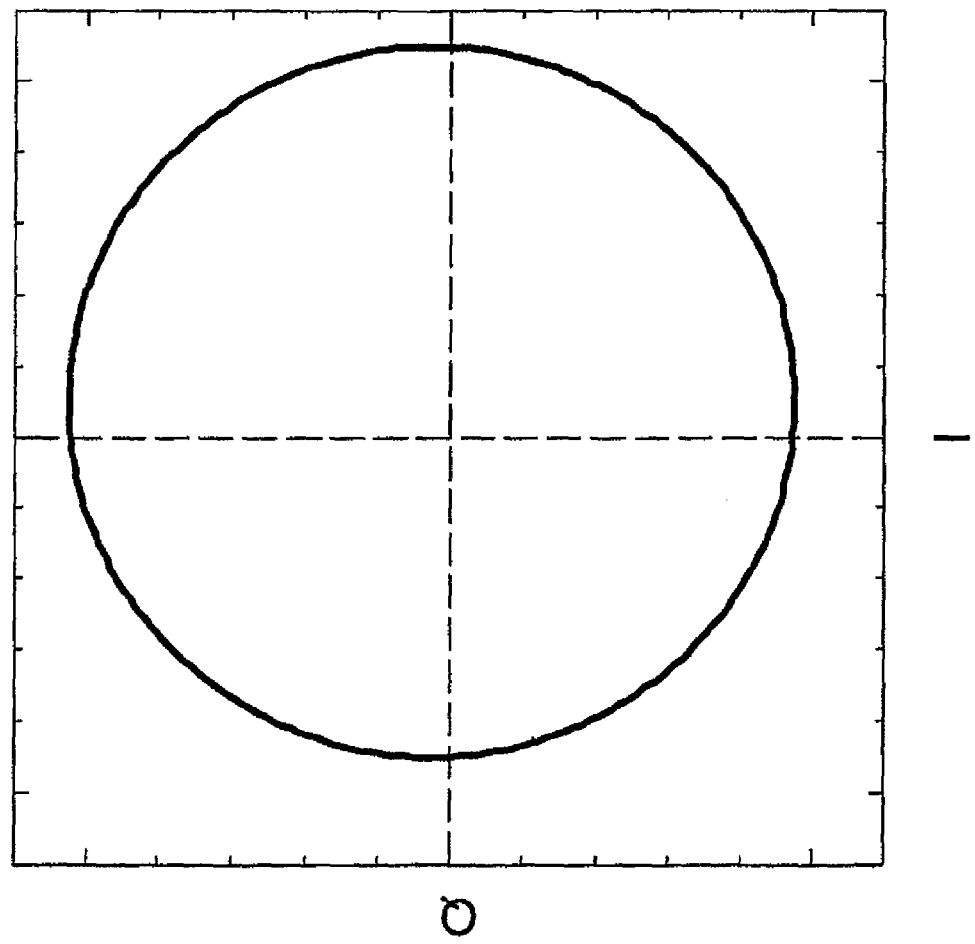
FIG. 4 is a diagram showing the constellation of an output signal from a quadrature modulator which presents a DC offset.
Figure 5:
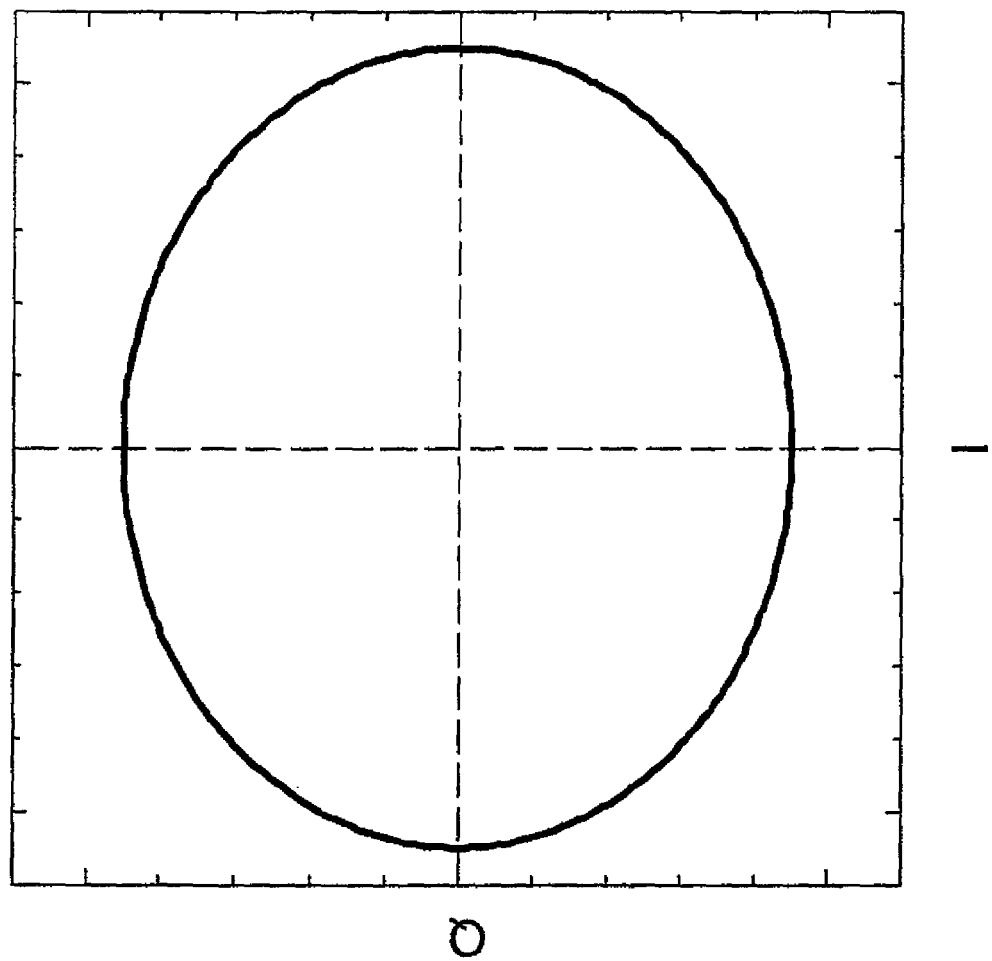
FIG. 5 is a diagram showing the constellation of an output signal from a quadrature modulator which presents an I/Q amplitude mismatch.
Figure 6:
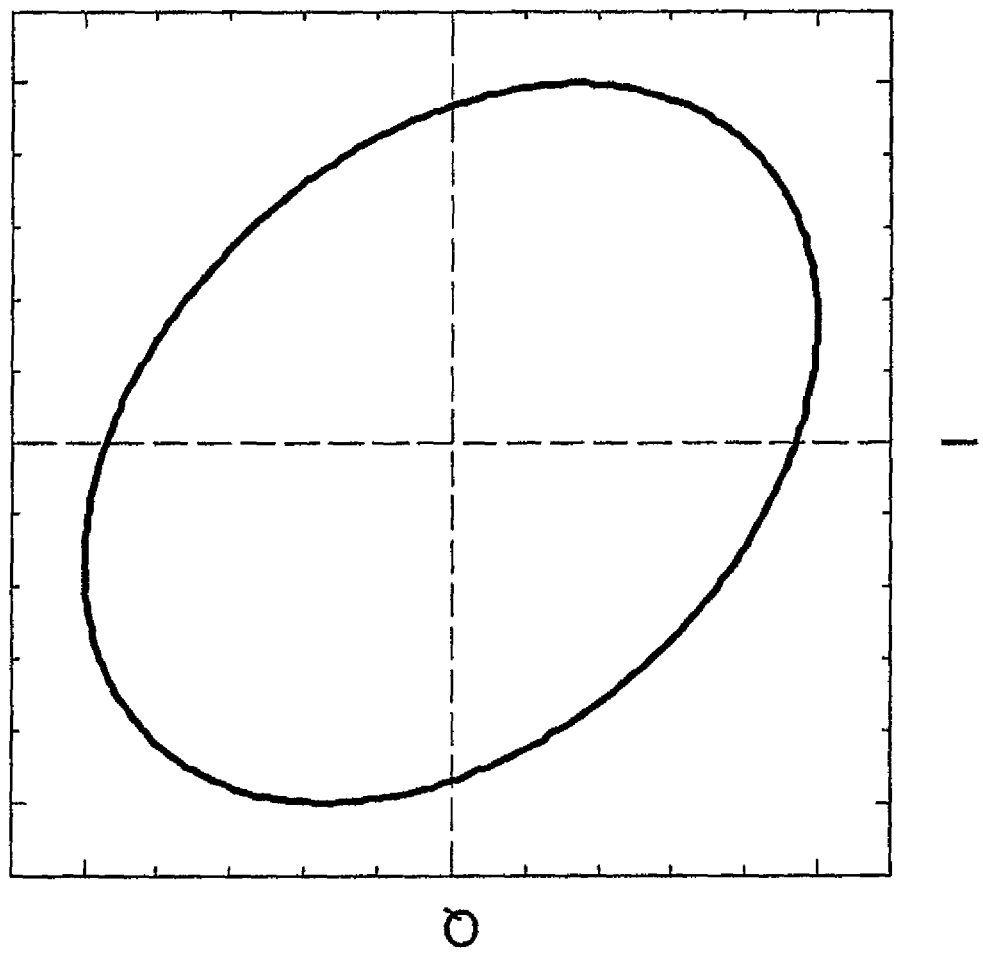
FIG. 6 is a diagram showing the constellation of an output signal from a quadrature modulator which presents an I/Q phase mismatch.
Figure 7:
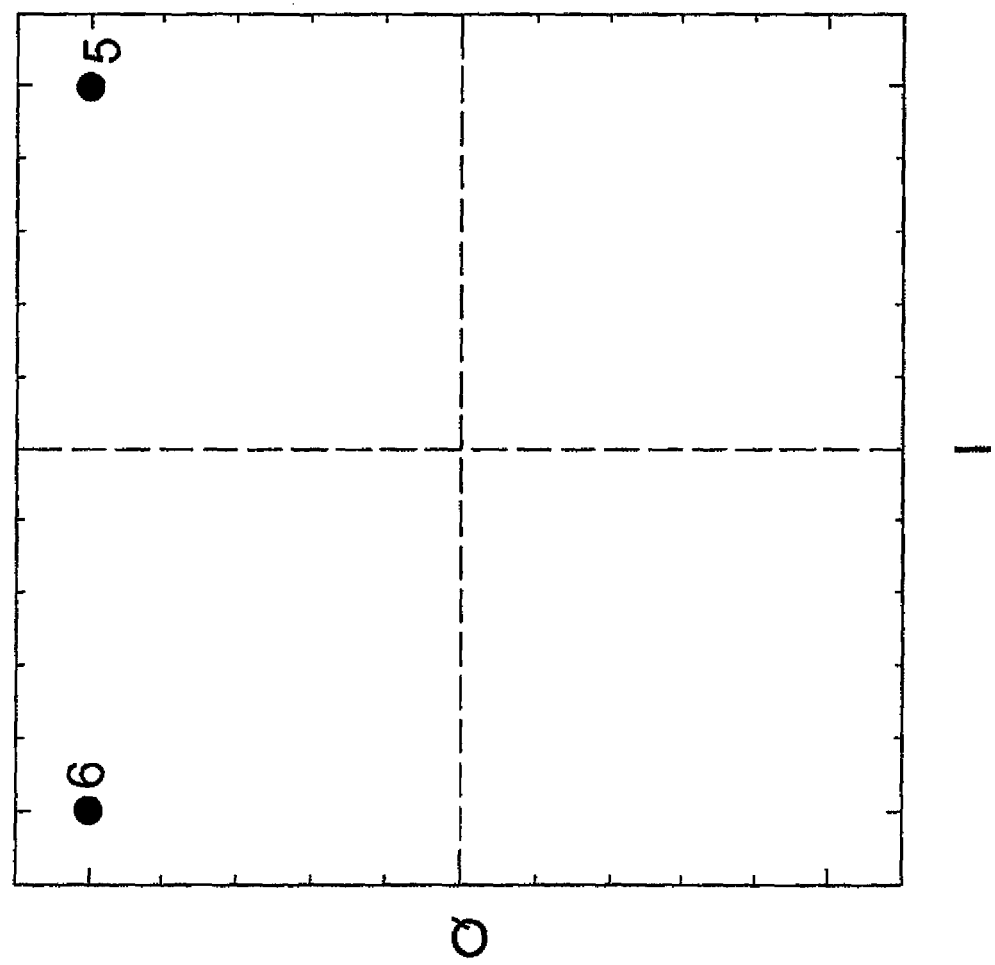
FIG. 7 is a diagram showing a test signal at two points used in a method disclosed in Patent Document 1.
Figure 8:
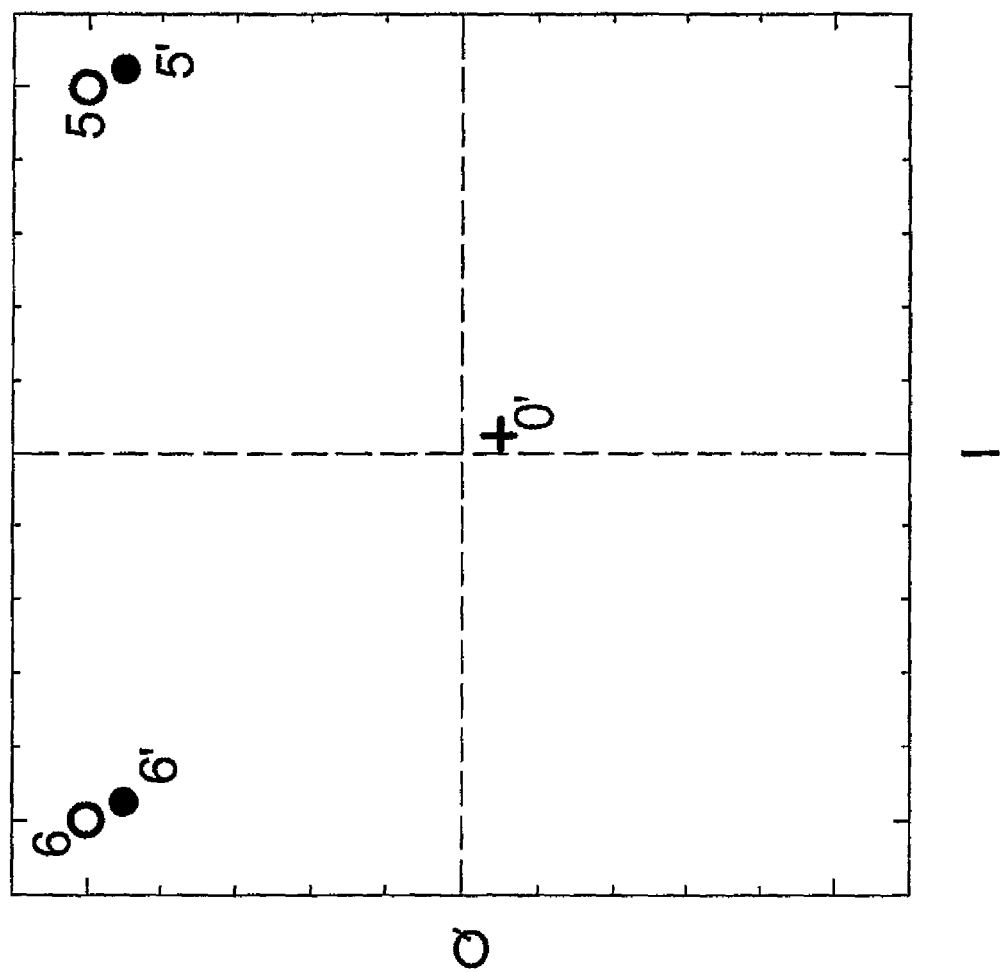
FIG. 8 is a diagram showing the test signal shown at two points in FIG. 7, which is shifted due to the influence of a DC offset.

In the following, the best mode for carrying out the present invention will be described with reference to the drawings. In this regard, it is a main object of the present invention to compensate a quadrature modulator for I/Q mismatches, and it is assumed that arbitrary conventional techniques (for example, means disclosed in JP-5-14429-A and JP-7-58791-A) are employed as means for compensating a quadrature modulator for a DC offset. For this reason, means for compensating a quadrature modulator for a DC offset will be omitted in the drawings described below.

First Exemplary Embodiment

Figure 9:
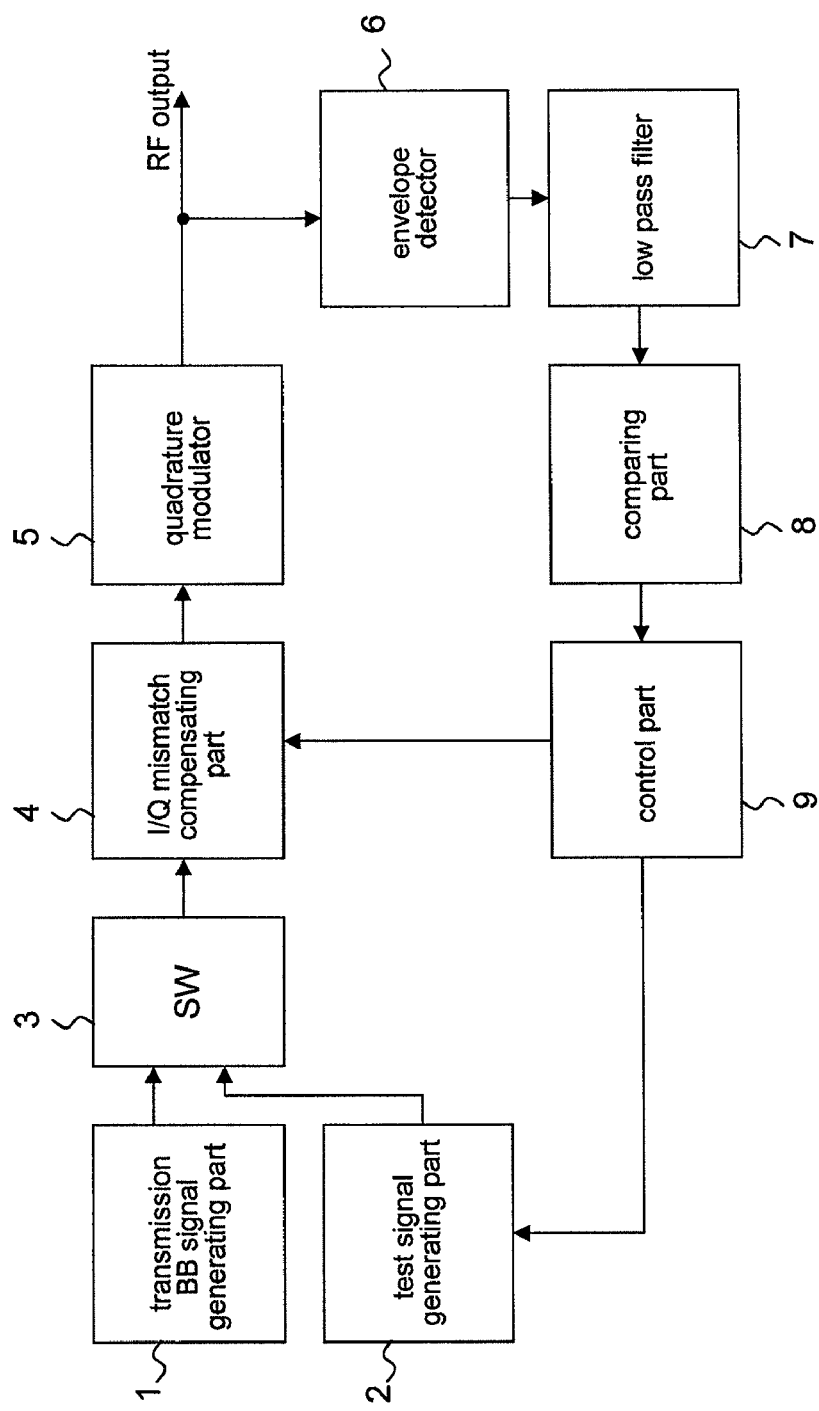
FIG. 9 is a block diagram showing the whole configuration of a signal processing circuit according to a first exemplary embodiment of the present invention.

FIG. 9 is a block diagram showing the whole configuration of a signal processing circuit according to a first exemplary embodiment of the present invention.

Referring to FIG. 9, the signal processing circuit of this exemplary embodiment comprises transmission BB (baseband) signal generating part 1; test signal generating part 2; switch 3 labeled SW; I/Q mismatch compensating part 4; quadrature modulator 5; envelope detector 6; low pass filter 7; comparing part 8; and control part 9.

Transmission BB signal generating part 1 generates a transmission baseband signal in a transmission operation.

Test signal generating part 2 sequentially generates two sets of combinations of I/Q-components of test signals which are AC signals under the control of control part 9 in a compensation operation.

Switch 3 selects the test signal generated by test signal generating part 2 in a compensation operation, and selects the transmission baseband signal generated by transmission BB signal generating part 1 in a transmission operation.

I/Q mismatch compensating part 4 performs an I/Q mismatch compensation for correcting a signal selected by switch 3 based on the compensation amount set by control part 9. In this regard, the compensation amount is set in a compensation operation.

Quadrature modulator 5 mixes I/Q-components of the signal corrected by I/Q mismatch compensating part 4 with I/Q-components of a local signal, respectively for up-conversion, and adds I/Q-components of the up-converted signals to each other. An RF signal, which has been quadrature modulated in this way, is output from the signal processing circuit.

Envelop detector 6 detects the amplitude of an envelope (envelope) of an output signal of quadrature modulator 5, and outputs a detection signal.

Low pass filter 7 passes therethrough only signals at frequencies equal to or lower than a cutoff frequency within output signals of envelope detector 6. Through the use of low pass filter 7, an AC component of the test signal is cut off, while a DC component alone passes therethrough within the output signals of envelope detector 6.

Comparing part 8 compares the magnitude of output values of low pass filter 7 when two sets of the test signals are generated, respectively, in a compensation operation.

Control part 9 controls test signal generating part 2 in a compensation operation to generate the two sets of test signals, and sets a compensation amount, for compensating quadrature modulator 5 for I/Q mismatches, in I/Q mismatch compensating part 4 based on the comparison result in comparing part 8.

Figure 10:
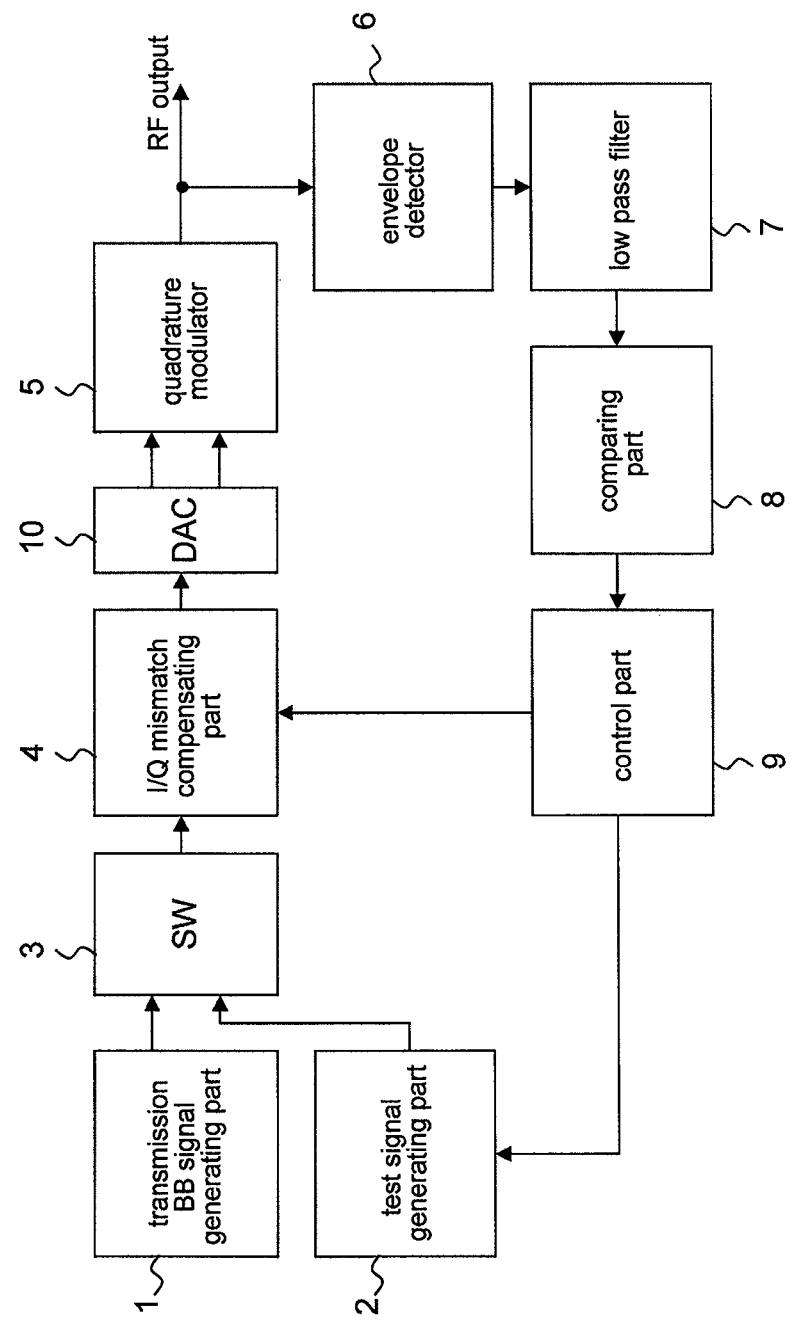
FIG. 10 is a block diagram showing the configuration of part of the signal processing circuit shown in FIG. 9, which is implemented by digital circuits.

Notably, parts from transmission BB signal generating part 1 and test signal generating part 2 to I/Q mismatch compensating part 4 may be implemented by digital circuits or implemented by analog circuits. FIG. 10 shows an implementation in which these parts are all implemented by digital circuits.

Referring to FIG. 10, between respective blocks from transmission BB signal generating part 1 and test signal generating part 2 to I/Q mismatch compensating part 4, I/Q-component signals, i.e., vector signals, are communicated as digital signals.

DA converter 10, labeled DAC, is connected at a stage that follows I/Q mismatch compensating part 4. DA converter 10 DA converts I/Q-components of a signal corrected by I/Q mismatch compensating part 4 from digital signals to analog signals. Thus, two output signals from DA converter 10 are applied to quadrature modulator 5 as analog signals of I/Q-components, respectively.

The following description will be given on the assumption that this exemplary embodiment has the configuration of FIG. 10 in which all parts from transmission BB signal generating part 1 and test signal generating part 2 to I/Q mismatch compensating part 4 are implemented by digital circuits.

Here, the configuration of comparing part 8 and I/Q mismatch compensating part 4 shown in FIG. 10 will be described in detail.

Figure 11:
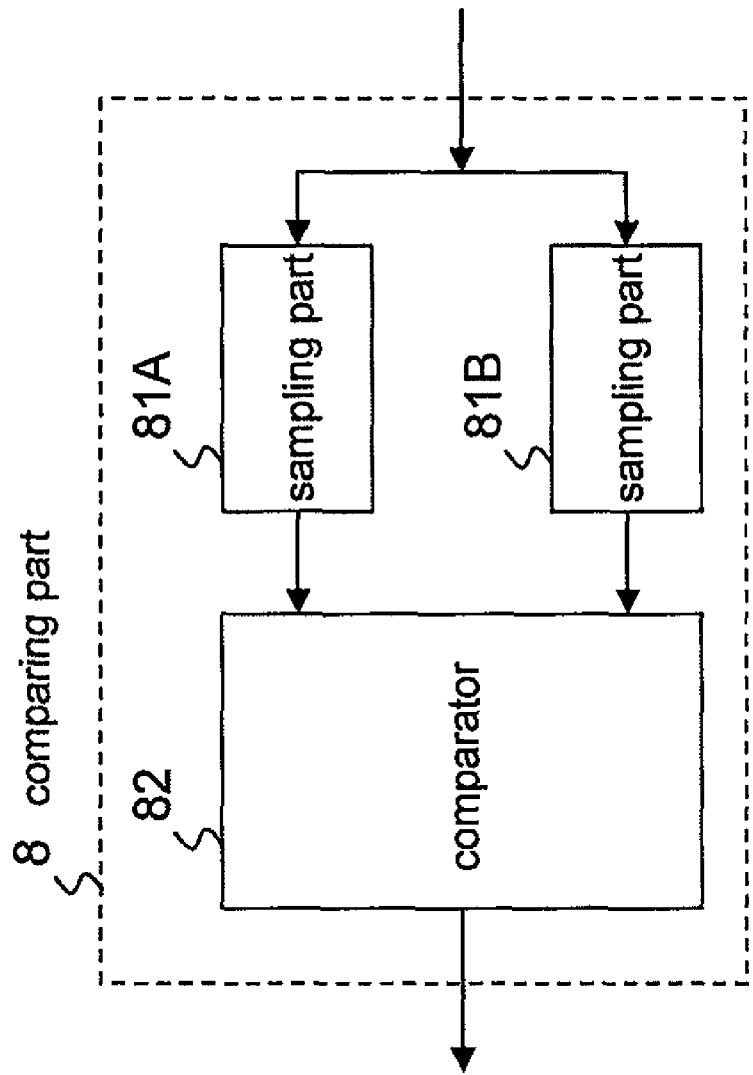
FIG. 11 is a block diagram showing an exemplary configuration of a comparing part shown in FIG. 10.

FIG. 11 is a block diagram showing the configuration of comparing part 8 shown in FIG. 10.

Referring to FIG. 11, comparing part 8 comprises sampling parts 81A, 81B, and comparator 82.

Sampling part 81A stores the output of low pass filter 7 when one set of test signals is generated, and outputs its output value.

Sampling part 81B stores the output of low pass filter 7 when the other set of test signals is generated, and outputs its output value.

Comparator 82 compares the magnitudes of the outputs from sampling parts 81A, 81B, and outputs the comparison result to control part 9 as a 1-bit signal.

Figure 12:
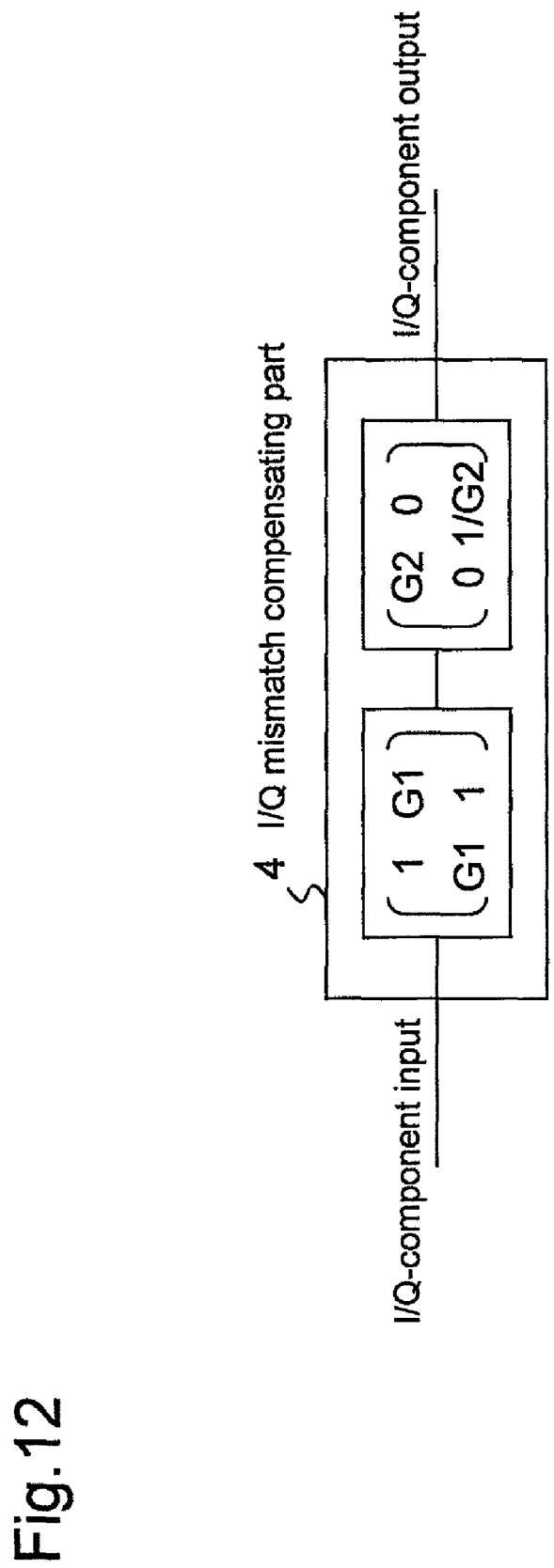
FIG. 12 is a diagram showing an exemplary configuration of an I/Q mismatch compensating part shown in FIG. 10.

FIG. 12 is a diagram showing the configuration of I/Q mismatch compensating part 4 shown in FIG. 10.

Referring to FIG. 12, I/Q mismatch compensating part 4 applies two matrix operations on I/Q-components of a transmission baseband signal in a cascade form. This cancels out I/Q mismatches of quadrature modulator 5.

Here, G1 is a parameter indicative of an I/Q phase compensation amount for compensating for an I/Q phase mismatch, and G2 is a parameter indicative of an I/Q amplitude compensation amount for compensating for an I/Q amplitude mismatch. In this regard, a method of calculating the I/Q phase compensation amount and the I/Q amplitude compensation amount will be described later.

Thus, in I/Q mismatch compensating part 4, in a transmission operation, the transmission baseband signal generated in transmission BB signal generating part 1 has its I-component corrected to G2I+G1G2Q, and its Q-component corrected to (G1/G2)I+(1/G2)Q.

Figure 13:
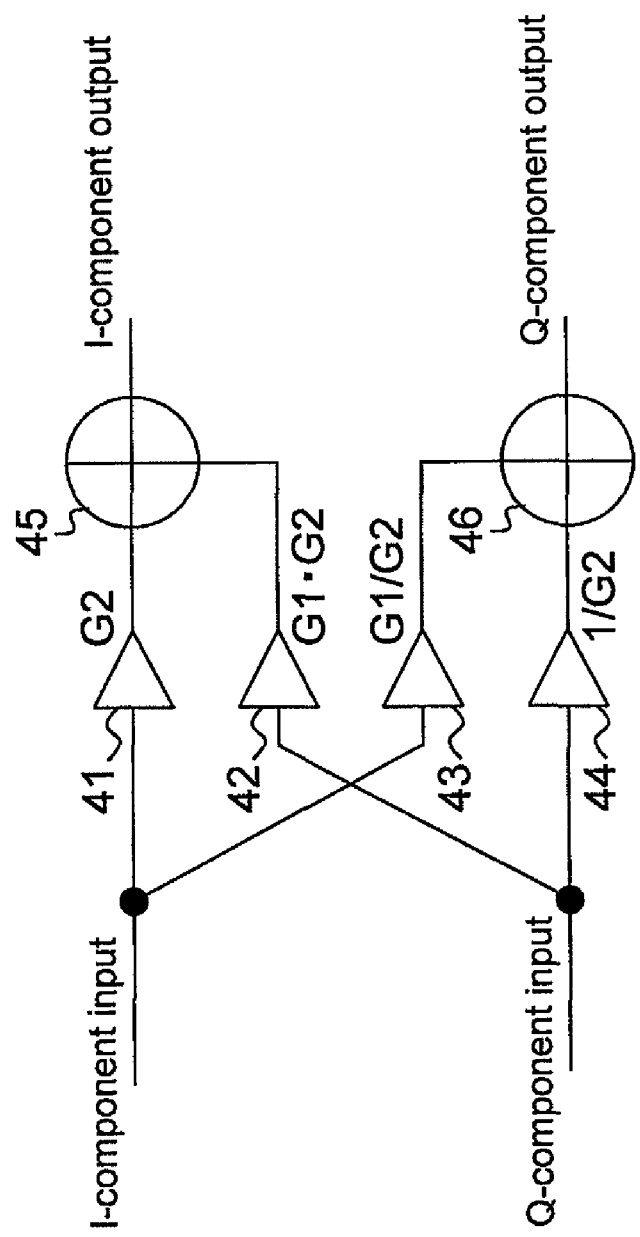
FIG. 13 is a diagram of the I/Q mismatch compensating part shown in FIG. 12, which is represented by amplifiers and adders.

FIG. 13 is a diagram showing I/Q mismatch compensating part 4, shown in FIG. 12, which is represented by amplifiers and adders.

Referring to FIG. 13, I/Q mismatch compensating part 4 comprises amplifier 41 for amplifying an I-component of an input signal with amplification factor G2; amplifier 42 for amplifying a Q-component of the input signal with amplification factor G1·G2; amplifier 43 for amplifying the I-component of the input signal with amplification factor G1/G2; amplifier 44 for amplifying the Q-component of the input signal with amplification factor 1/G2; adder 45 for adding outputs of amplifiers 41, 42; and adder 46 for adding outputs of amplifiers 43, 44. With such a configuration, I/Q mismatch compensating part 4 can be implemented in an analog domain.

In the following, a description will be given of the operation of the signal processing circuit of this exemplary embodiment.

Figure 14:
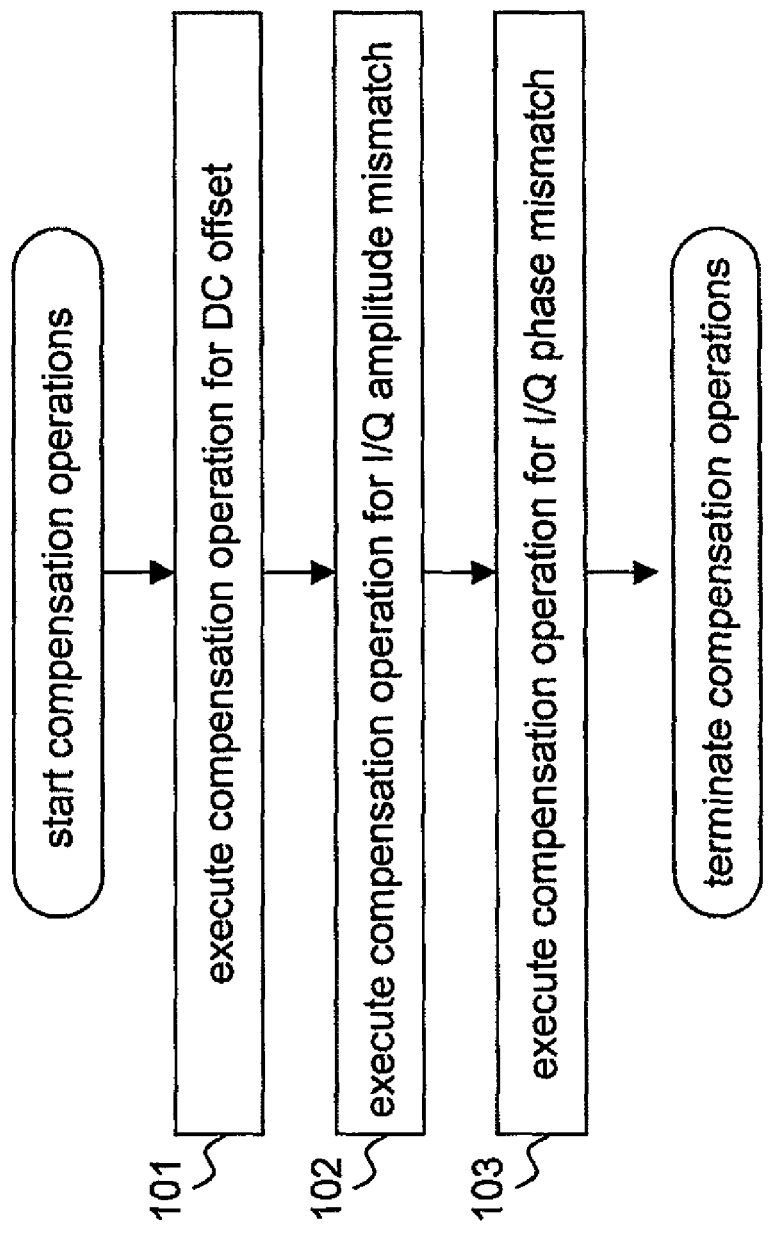
FIG. 14 is a flow chart for describing the sequence of compensation operations by the signal processing circuit shown in FIG. 10.

FIG. 14 is a flow chart for describing the flow of a sequence of compensation operations by the signal processing circuit shown in FIG. 10.

Referring to FIG. 14, the signal processing circuit of this exemplary embodiment first performs a compensation operation for DC offsets of the I-component and Q-component, respectively (step 101), next performs a compensation operation for I/Q amplitude mismatch (step 102), and finally performs a compensation operation for I/Q phase mismatch (step 103).

It should be noted that the compensation operation for the DC offset is performed by means similar to a conventional technique, not shown in FIG. 10, as described above, and is not an essential part of the present invention. For this reason, the following description will be given only of the compensation operation for I/Q amplitude mismatch and I/Q phase mismatch, with the compensation operation for the DC offset being omitted from the following description.

First, a description will be given of the compensation operation for I/Q amplitude mismatch.

Figure 15:
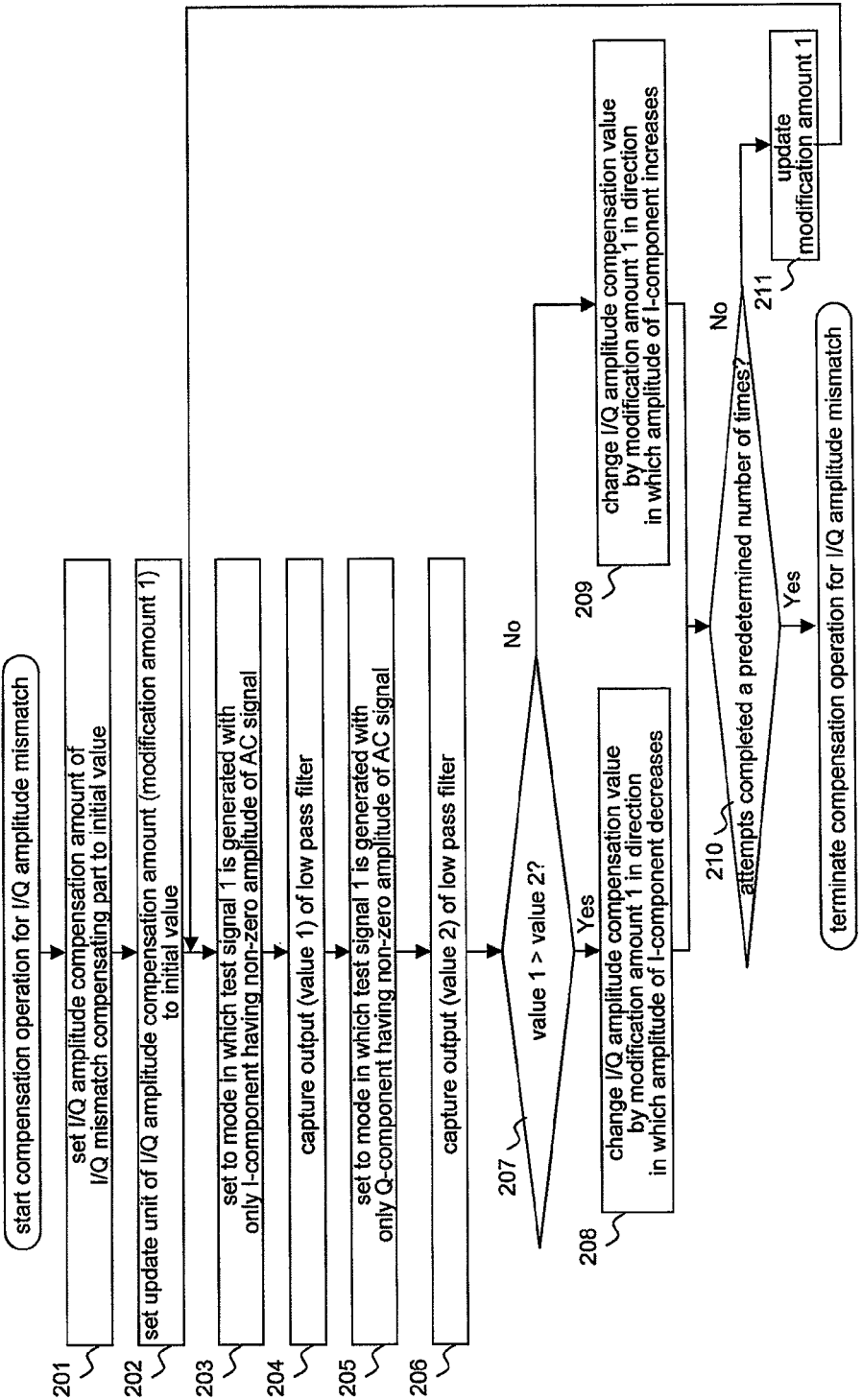
FIG. 15 is a flow chart for describing the compensation operation for I/Q amplitude mismatch by the signal processing circuit shown in FIG. 10.

FIG. 15 is a flow chart for describing the compensation operation for I/Q amplitude mismatch by the signal processing circuit shown in FIG. 10.

Referring to FIG. 15, control part 9 first sets an I/Q amplitude compensation amount in I/Q mismatch compensating part 4 to an initial value (step 201). Typically, control part 9 selects an initial value such that amplitude gains of I/Q-components are equal.

Next, control part 9 sets an update unit (hereinafter referred to as "modification increment 1") for updating the I/Q amplitude compensation amount to an initial value (step 202).

Next, control part 9 sets test signal generating part 2 to a mode in which test signal generating part 2 is forced to generate test signal 1 which comprises an I-component that is an AC signal with a non-zero amplitude value and a Q-component that is an AC signal with a zero amplitude value (step 203). While this mode is maintained, DA converter 10 outputs an AC signal proportional to an input signal. This AC signal is mixed with a local signal in quadrature modulator 5. Accordingly, an RF signal modulated by the AC signal appears at the output of quadrature modulator 5. The amplitude of this RF signal is detected by envelope detector 6.

In this regard, since envelope detector 6 generally has a square characteristic, the output of envelope detector 6 presents a signal proportional to a square of the amplitude of an output signal of quadrature modulator 5. Specifically, since envelope detector 6 detects a square of the RF signal modulated by the AC signal, a DC component and a frequency component twice an AC component of test signal 1, which is an envelope component, mainly appear at the output of envelope detector 6 at frequencies sufficiently lower than the local signal.

Next, low pass filter 7 passes therethrough only frequency components equal to or lower than the cutoff frequency to suppress the frequency component that is twice the AC component of test signal 1 which is the envelope component. In this event, the cutoff frequency of low pass filter 7 is set to a frequency equal to or lower than the frequency that is twice the AC component of test signal 1, and, particularly when a DC offset exists in quadrature modulator 5, is set to a frequency equal to or lower than the frequency of the AC component of test signal 1 resulting from the DC offset.

Next, comparing part 8 captures the output of low pass filter 7 (step 204).

Subsequently, control part 9 controls comparing part 8 to capture the output of low pass filter 7 when test signal 2 is generated, in a similar manner for test signal 2 which comprises a Q-component that is an AC signal with a non-zero amplitude value and an I-component which is an AC signal with a zero amplitude value (steps 205, 206).

After the capturing is completed, comparing part 8 finds the output value of low pass filter 7 when test signal 1 is generated (this is referred to as "value 1"), and the output value of low pass filer 7 when test signal 2 is generated (this is referred to as "value 2").

Figure 18:
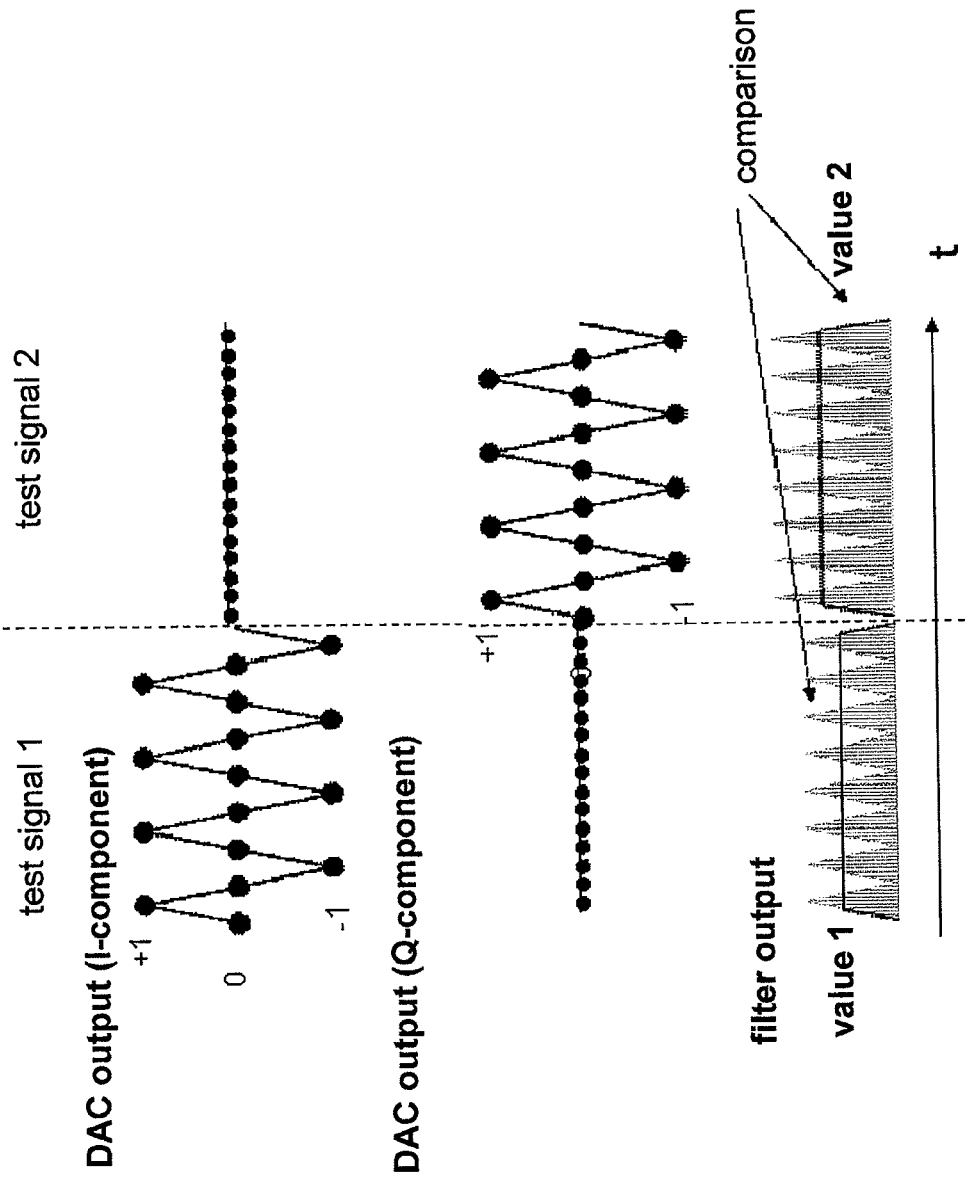
FIG. 18 is a diagram for describing that there is a difference in filter output when two sets of test signals are generated, in the compensation operation for I/Q amplitude mismatch by the signal processing circuit shown in FIG. 10.

Here, when no I/Q amplitude mismatch exists in quadrature modulator 5, the I/Q-components are equal in amplitude in test signals 1, 2, as shown in FIG. 16, but when an I/Q amplitude mismatch exists, variations appear in the amplitude of the I/Q-components, as shown in FIG. 17. Also, when an I/Q amplitude mismatch exists, changes appear in value 1 and value 2 which are output values of low pass filter 7, as shown in FIG. 18, upon generation of test signals 1, 2.

Comparing part 8 compares the magnitude of value 1 and value 2, and passes the comparison result to control part 9 (step 207).

Next, control part 9 updates the amplitude of the I-component of the test signal such that value 1 is equal to value 2, based on the comparison result at step 207. Specifically, when value 1 is larger at step 207, control part 9 changes the I/Q amplitude compensation amount by modification amount 1 in a direction in which the amplitude of the I-component decreases (step 208). On the other hand, when value 2 is larger at step 207, control part 9 changes the I/Q amplitude compensation amount by modification amount 1 in a direction in which the amplitude of the I-component increases (step 209).

Subsequently, control part 9 repeats the processing for updating modification amount 1 (step 211) and repeats the processing at step 203 through steps 208, 209 until control part 9 completes attempts of step 203 through steps 208, 209 a predetermined number of times (step 210).

When the attempts have been completed the predetermined number of times, the compensation operation for I/Q amplitude mismatch terminates.

Here, the AC signals used as the test signals need not be generated using a smooth sinusoidal wave which is difficult to implement, but can be generated using a simple rectangular wave, triangular wave or the like which is easy to implement.

Figure 19:
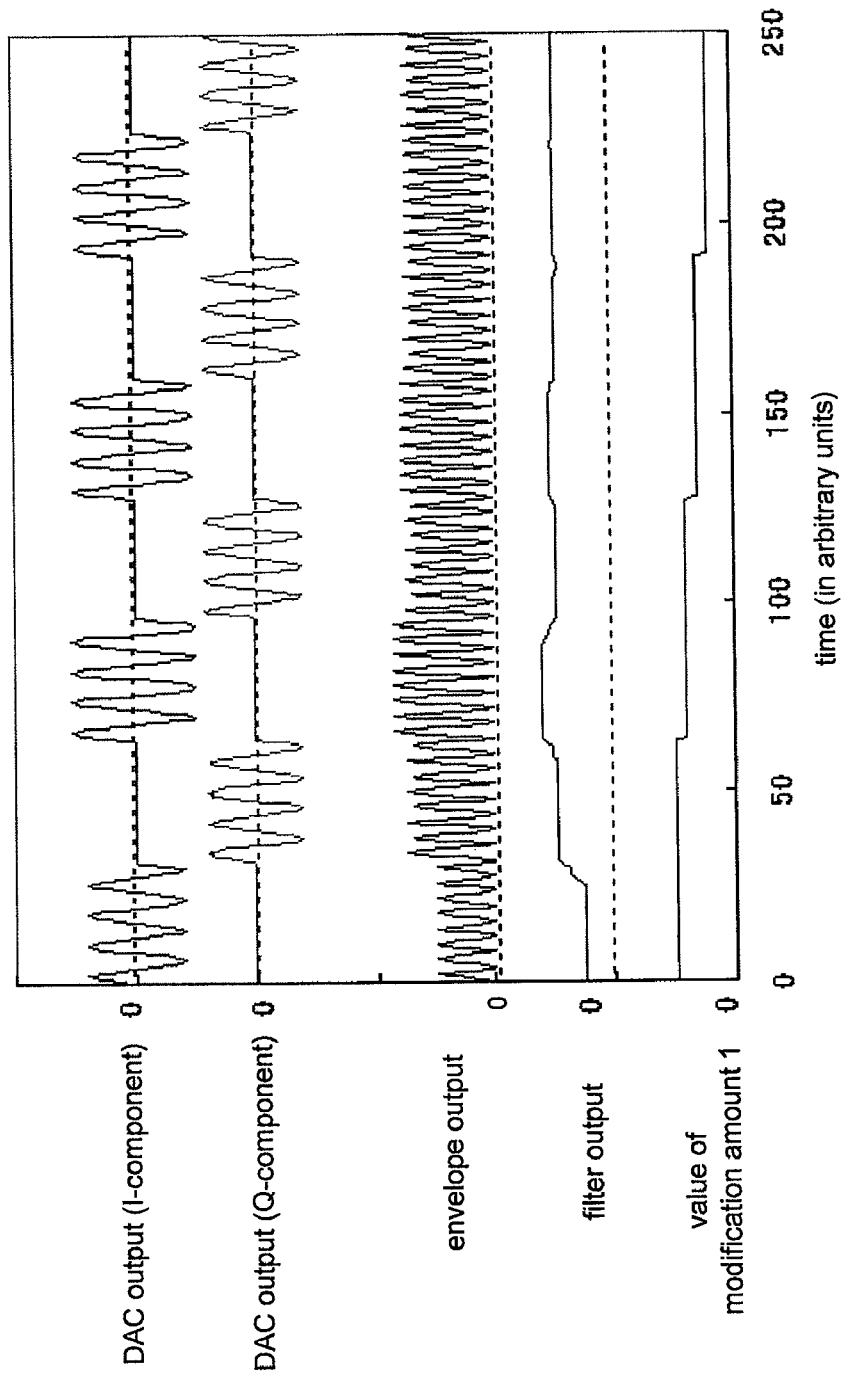
FIG. 19 is a timing chart for describing a compensation operation for I/Q amplitude mismatch by the signal processing circuit shown in FIG. 10.

FIG. 19 is a timing chart for describing a compensation operation for I/Q amplitude mismatch by the signal processing circuit shown in FIG. 10, showing changes of the internal signals in time series. In this regard, the same value is set for initial values for the amplitudes of I-components and Q-components of test signals.

Referring to FIG. 19, test signal generating part 2 sequentially generates test signal 1 which is an AC signal with only an I-component having a non-zero amplitude value, and test signal 2 which is an AC signal with only a Q-component having a non-zero amplitude value.

Here, the output of low pass filter 7 when test signal 1 is being generated is smaller than the output of low pass filter 7 when test signal 2 is being generated.

Accordingly, control part 9 changes the I/Q amplitude compensation amount by modification amount 1 in a direction in which the I-component of test signal 1 increases in amplitude, and subsequently updates the value of modification amount 1 to a smaller value.

Again, test signal generating part 2 sequentially generates test signal 1 which is an AC signal with only an I-component having a non-zero amplitude value, and test signal 2 which is an AC signal with only a Q-component having a non-zero amplitude value.

Here, the output of low pass filter 7 when test signal 1 is being generated is larger than the output of low pass filter 7 when test signal 2 is being generated.

Accordingly, control part 9 changes the I/Q amplitude compensation amount by modification amount 1 in a direction in which the I-component of test signal 1 decreases in amplitude, and subsequently updates the value of modification amount 1 to a smaller value.

Control unit 9 repeats operations from the generation of the test signals to the update of the value of modification amount 1 a predetermined number of times (four times in FIG. 19).

In the meantime, control part 9 gradually reduces the value of modification amount 1, so that the difference between the outputs of low pass filter 7 when test signals 1, 2 are generated, gradually approaches zero. The finally derived I/Q amplitude compensation amount is set in I/Q mismatch compensating part 4 as an I/Q amplitude compensation amount for compensating a transmission baseband signal generated by transmission BB signal generating part 1.

Further, a description will be given of a compensation operation for I/Q phase mismatch.

Figure 20:
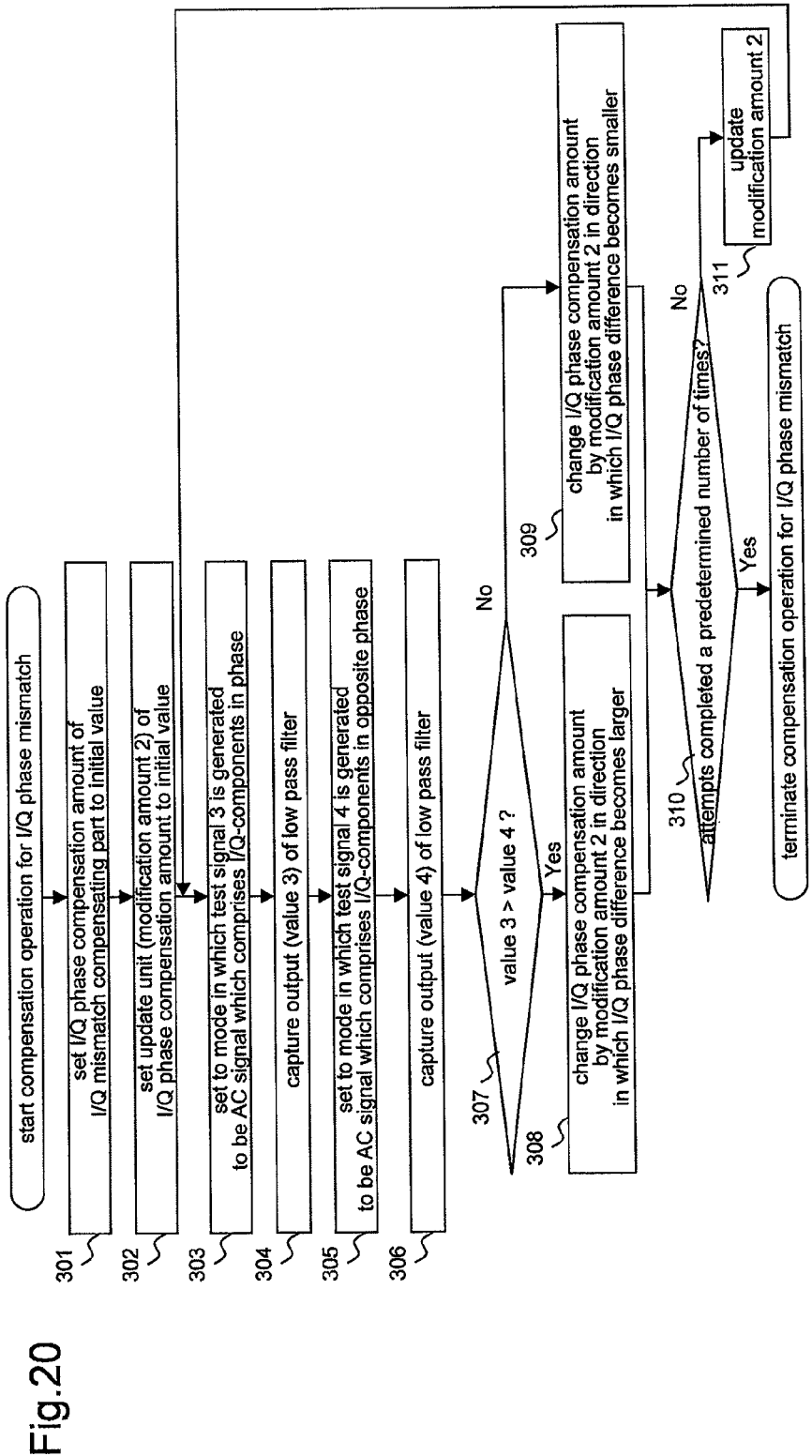
FIG. 20 is a flow chart for describing a compensation operation for I/Q phase mismatch by the signal processing circuit shown in FIG. 10.

FIG. 20 is a flow chart for describing the compensation operation for I/Q phase mismatch by the signal processing circuit shown in FIG. 10.

Referring to FIG. 20, control part 9 first sets the I/Q phase compensation amount of I/Q mismatch compensating part 4 to an initial value (step 301). Typically, control part 9 selects the initial value such that the phase difference between I/Q-components is 90 degrees.

Next, control part 9 sets an update unit when the I/Q phase compensation amount is updated (hereinafter referred to as "modification amount 2") to an initial value (step 302).

In this event, for matching the amplitude of an RF signal in the compensation operation for I/Q amplitude mismatch and in the compensation operation for I/Q phase mismatch, test signal generating part 2 may set the amplitudes of both I/Q-components of the test signals $1/\sqrt{2}$ times larger than those in the compensation operation for I/Q amplitude mismatch, or I/Q mismatch compensating part 2 may set amplitude gains of both I/Q-components of the test signals $1/\sqrt{2}$ times larger than those in the compensation operation for I/Q amplitude mismatch.

Next, control part 9 sets test signal generating part 2 in a mode in which test signal generating part 2 is forced to generate test signal 3 which is an AC signal having I/Q-components in phase and a non-zero amplitude value (step 303).

While this mode is maintained, DA converter 10 outputs an AC signal proportional to an input signal. This AC signal is mixed with a local signal in quadrature modulator 5. Accordingly, an RF signal modulated by the AC signal appears at the output of quadrature modulator 5. The amplitude of this RF signal is detected by envelope detector 6.

In this regard, since envelope detector 6 generally has a square characteristic, the output of envelope detector 6 presents a signal proportional to the square of the amplitude of an output signal of quadrature modulator 5. Specifically, since envelope detector 6 detects the square of the RF signal modulated by the AC signal, a DC component and a frequency component that is twice the AC component of test signal 3, which is an envelope component, mainly appear at the output of envelope detector 6 at frequencies that are sufficiently lower than the local signal.

Next, low pass filter 7 passes therethrough only frequency components equal to or lower than the cutoff frequency to suppress the frequency component that is twice the AC component of test signal 3 which is the envelope component.

Next, comparing part 8 captures the output of low pass filter 7 (step 304).

Subsequently, control part 9 controls comparing part 8 to capture the output of low pass filter 7 when test signal 4 is generated, in a similar manner for test signal 4 which comprises an AC signal with I/Q-component out of phase with each other, and with a non-zero amplitude value (steps 305, 306).

After the capturing is completed, comparing part 8 finds the output value of low pass filter 7 when test signal 3 is generated (this is referred to as "value 3"), and the output value of low pass filer 7 when test signal 4 is generated (this is referred to as "value 4").

Figure 23:
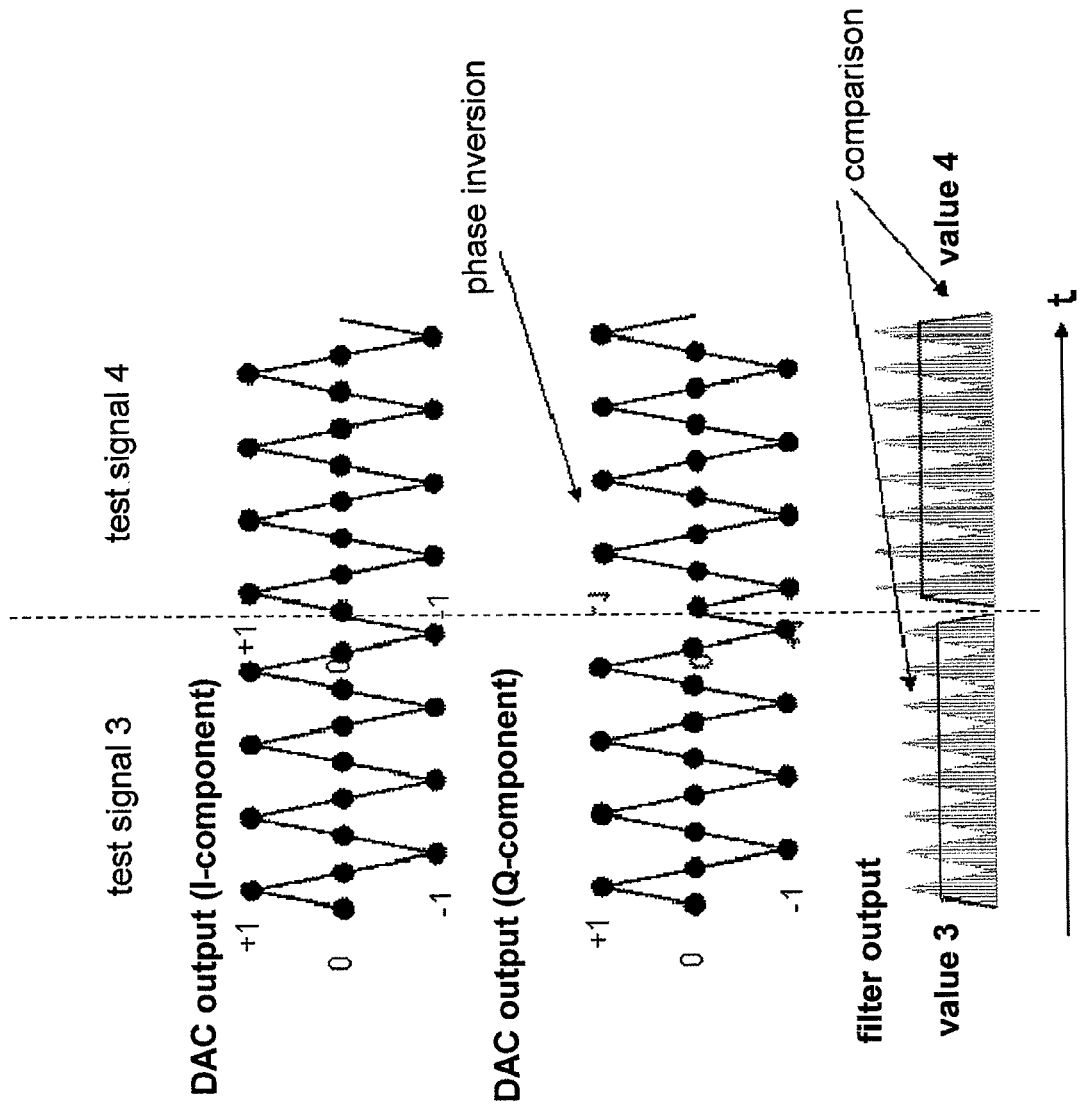
FIG. 23 is a diagram for describing that there is a difference in filter output when two sets of test signals are generated, in the compensation operation for I/Q phase mismatch by the signal processing circuit shown in FIG. 10.

Here, when no I/Q phase mismatch exists in quadrature modulator 5, there is no distortion in test signals 3, 4, as shown in FIG. 21, but when an I/Q phase mismatch exists, distortion occurs in an amount equal to the amount of I/Q phase mismatch, as shown in FIG. 22. Also, when an I/Q phase mismatch exists, changes appear in value 3 and value 4 which are output values of low pass filter 7, as shown in FIG. 23, upon generation of test signals 3, 4.

Comparing part 8 compares the magnitude of value 3 and value 4, and passes the comparison result to control part 9 (step 307).

Next, control part 9 updates the phase difference between the I/Q-components of the test signal such that value 3 is equal to value 4, based on the comparison result at step 307. Specifically, when value 3 is larger at step 307, control part 9 changes the I/Q phase compensation amount by modification amount 2 in a direction in which the I/Q phase difference becomes larger (step 308). On the other hand, when value 4 is larger at step 307, control part 9 changes the I/Q phase compensation amount by modification amount 2 in a direction in which the I/Q phase difference becomes smaller (step 309).

Subsequently, control part 9 repeats the processing for updating modification amount 2 (step 311) and repeats the processing at step 303 through steps 308, 309 until control part 9 completes attempts of step 303 through steps 308, 309 a predetermined number of times (step 310).

When the attempts have been completed the predetermined number of times, the compensation operation for I/Q phase mismatch terminates.

Figure 24:
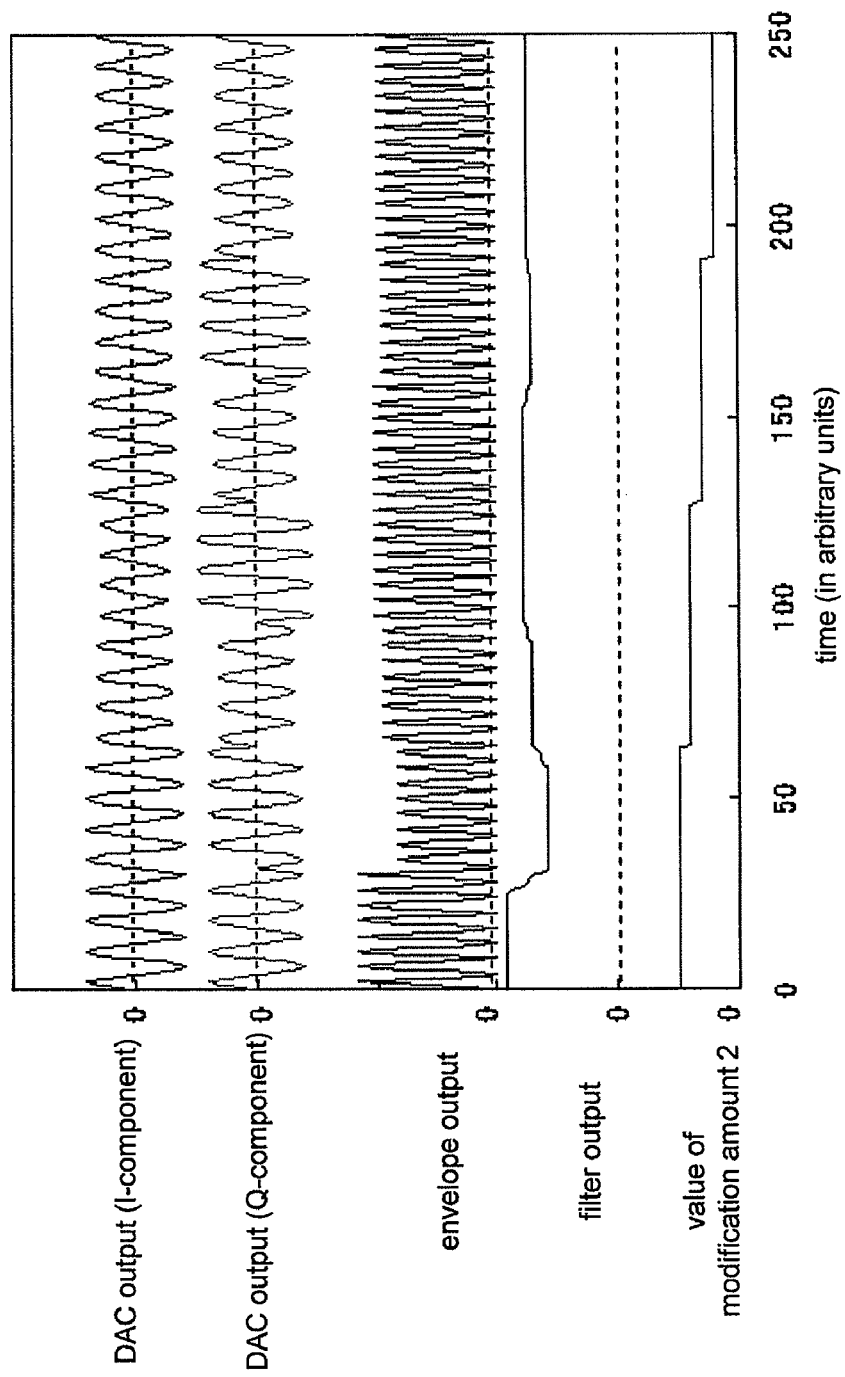
FIG. 24 is a timing chart for describing a compensation operation for I/Q phase mismatch by the signal processing circuit shown in FIG. 10.

FIG. 24 is a timing chart for describing the compensation operation for I/Q amplitude mismatch by signal processing circuit shown in FIG. 10, showing changes of the internal signals in time series. In this regard, the same value is set for initial values for the amplitudes of I-components and Q-components of test signals.

Referring to FIG. 24, test signal generating part 2 sequentially generates test signal 3 which is an AC signal with I/Q-components in phase and a non-zero amplitude value, and test signal 4 which is an AC signal with I/Q-components out of phase and a non-zero amplitude value.

Here, the output of low pass filter 7 when test signal 3 is being generated is larger than the output of low pass filter 7 when test signal 4 is being generated.

Accordingly, control part 9 changes the I/Q phase compensation amount by modification amount 2 in a direction in which the I/Q phase difference becomes larger, and subsequently updates the value of modification amount 2 to a smaller value.

Again, test signal generating part 2 sequentially generates test signal 3 which is an AC signal with I/Q-components in phase and a non-zero amplitude value, and test signal 4 which is an AC signal with I/Q-components out of phase and a non-zero amplitude value.

Here, the output of low pass filter 7 when test signal 3 is being generated is smaller than the output of low pass filter 7 when test signal 4 is being generated.

Accordingly, control part 9 changes the I/Q phase compensation amount by modification amount 2 in a direction in which the I/Q phase difference becomes smaller, and subsequently updates the value of modification amount 2 to a smaller value.

Control unit 9 repeats operations from the generation of the test signals to the update of the value of modification amount 2 a predetermined number of times (four times in FIG. 24).

In the meantime, control part 9 gradually reduces the value of modification amount 2, so that the difference between the outputs of low pass filter 7 when test signals 3, 4 are generated, gradually approaches zero. The finally derived I/Q phase compensation amount is set to I/Q mismatch compensating part 4 as an I/Q phase compensation amount for compensating the transmission baseband signal generated by transmission BB signal generating part 1.

Figure 26:
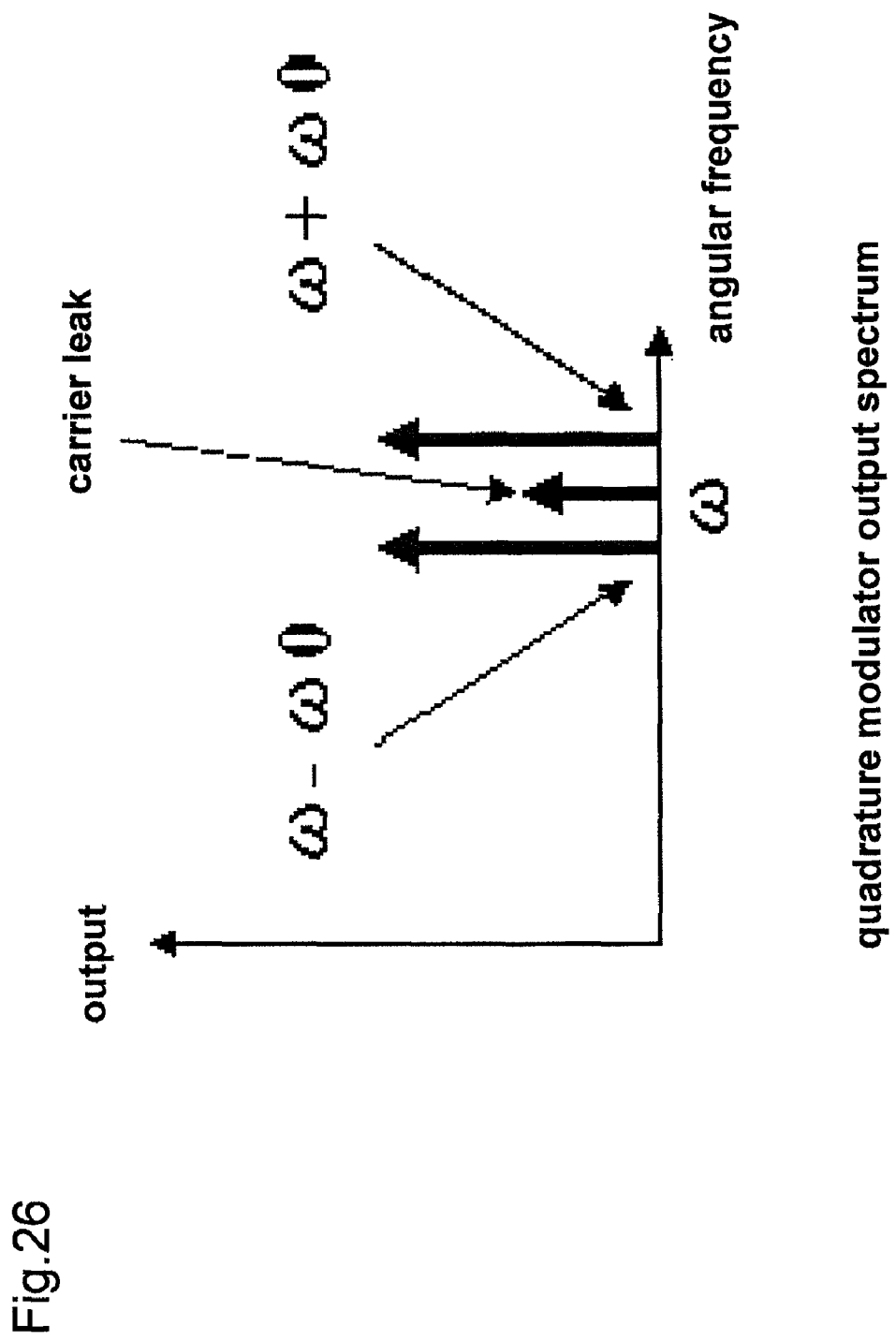
FIG. 26 is a diagram for describing the output spectrum of a quadrature modulator shown in FIG. 10.
Figure 27:
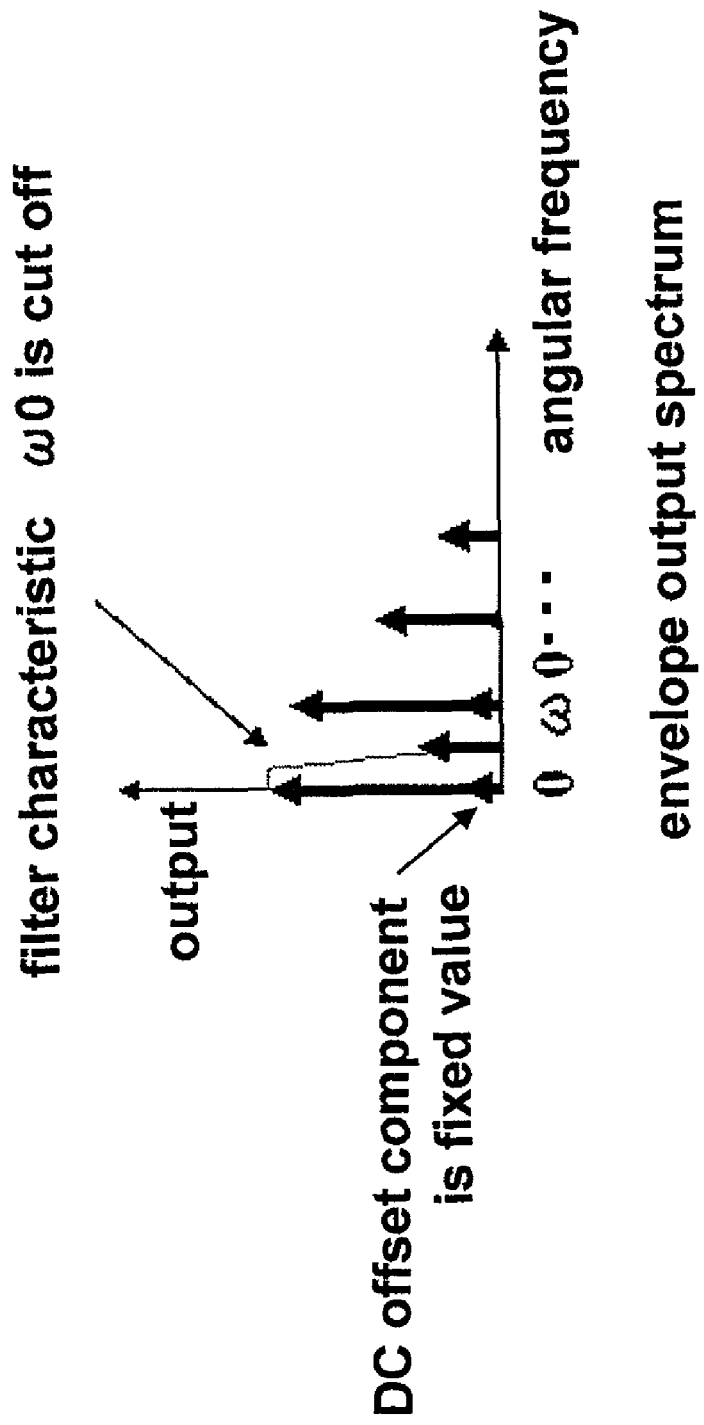
FIG. 27 is a diagram for describing the output spectrum of an envelope detector shown in FIG. 10.

Here, the first advantage of this exemplary embodiment will be described with reference to FIGS. 25~27.

First, assume a case where quadrature modulator 5 does not suffer from either an I/Q mismatch or a DC offset.

Two sets of test signals for use in the compensation operation for I/Q mismatches are both AC signals. The test signals (hereinafter referred to as the "AC test signal" as appropriate) have an angular frequency designated by ω0, and amplitude designated by A. In this event, when a local signal at angular frequency ω is modulated by this AC test signal in quadrature modulator 5, the modulated signal is represented by Equation 2:

$$\cos(\omega \cdot t) \cdot A \cdot \cos(\omega 0 \cdot t) = A \cdot \cos(\omega \cdot t + \omega 0 \cdot t) + A \cdot \cos(\omega \cdot t - \omega 0 \cdot t) \quad \text{[Equation 2]}$$

Accordingly, two RF frequency components ω0+ω and ω0−ω mainly appear in the output signal of quadrature modulator 5. When the output signal of quadrature modulator 5 having these RF frequency components is square-law detected by envelope detector 6, the detected signal is represented by Equation 3:

$$\{\cos(\omega \cdot t) \cdot A \cdot \cos(\omega 0 \cdot t)\}^2 = \left\{ \frac{A \cdot \cos(\omega \cdot t + \omega 0 \cdot t) + A \cdot}{\cos(\omega \cdot t - \omega 0 \cdot t)} \right\}^2 \quad \text{[Equation 3]}$$

$$= A^2 \begin{Bmatrix} \cos^2(\omega \cdot t + \omega 0 \cdot t) + \\ \cos^2(\omega \cdot t - \omega 0 \cdot t) + \\ 2\cos(\omega \cdot t + \omega 0 \cdot t) \\ \cos(\omega \cdot t - \omega 0 \cdot t) \end{Bmatrix}$$

$$= \frac{A^2 \begin{bmatrix} \{1 - \cos(2\omega \cdot t + 2\omega 0 \cdot t)\} + \\ \{1 - \cos(2\omega \cdot t - 2\omega 0 \cdot t)\} + \\ \cos(2\omega \cdot t)\cos(2\omega 0 \cdot t) \end{bmatrix}}{2}$$

Subsequently, the output signal of envelope detector 6 is filtered by low pass filter 7 to extract a near DC component. Consequently, DC output of AA2 appears in proportion to the square of amplitude A of the AC test signal.

Here, the respective amplitudes of I/Q-components of the AC test signals are designated by (I,Q)=(1,0), (0,1) or (I,Q)=(1,1), (1,−1). When quadrature modulator 5 does not suffer from either I/Q mismatches or DC offset, the outputs of low pass filter 7 are equal when these two sets of test signals are generated.

Figure 25:
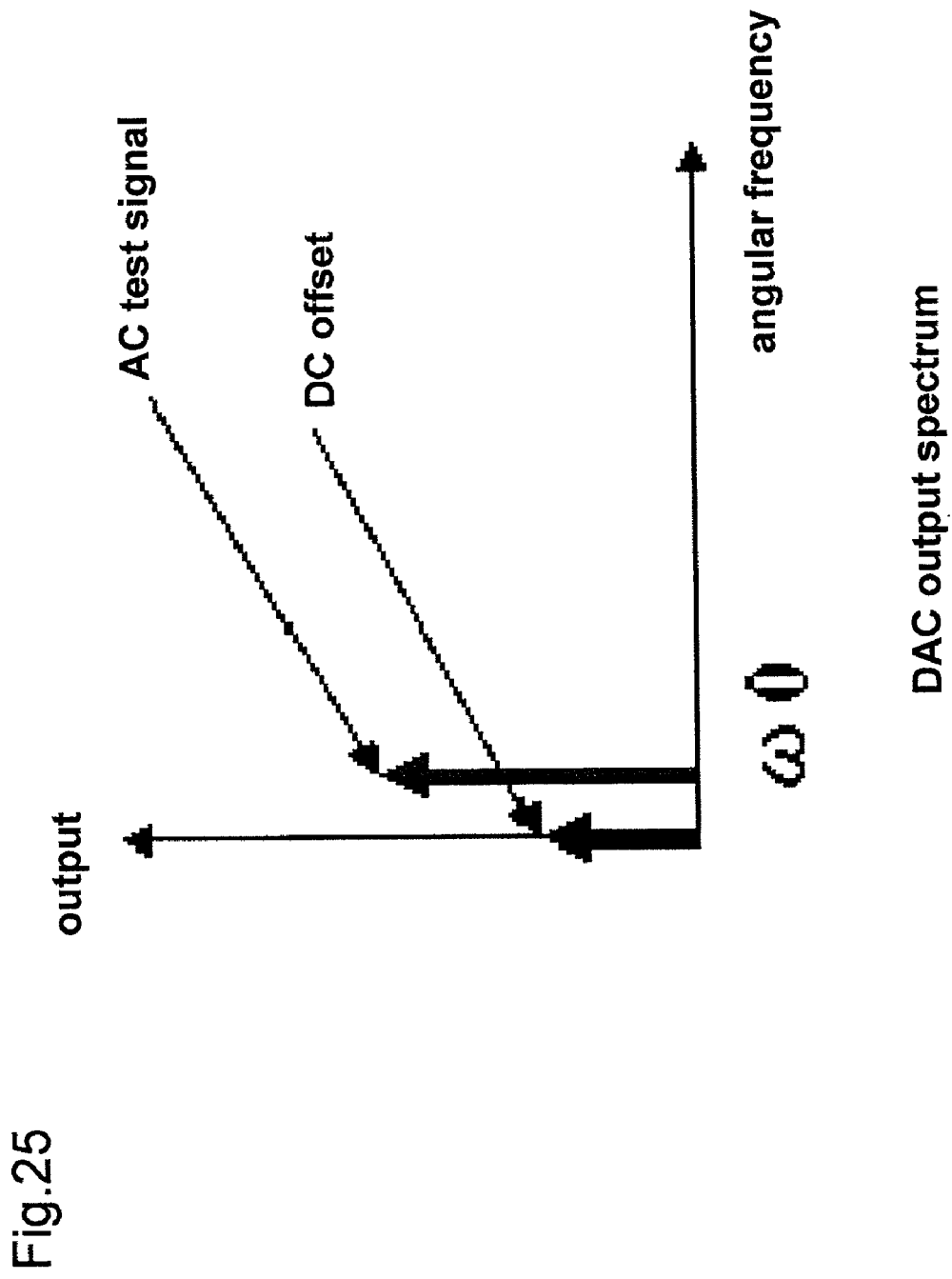
FIG. 25 is a diagram for describing the output spectrum of a DA converter shown in FIG. 10.

On the other hand, assume that DC offset B exists in quadrature modulator 5, and a carrier leak appears due to DC offset B (FIG. 25).

In this event, a signal modulated by quadrature modulator 5 is represented by Equation 4:

$$\cos(\omega \cdot t) \cdot \{A \cdot \cos(\omega 0 \cdot t) + B\} = A \cdot \cos(\omega \cdot t + \omega 0 \cdot t) + A \cdot \cos(\omega \cdot t - \omega 0 \cdot t) + B \cdot \cos(\omega \cdot t) \quad \text{[Equation 4]}$$

Accordingly, an RF frequency component of ω appears in the output signal of quadrature modulator 5 in addition to the two RF frequency components ω0+ω and ω0−ω. In other words, three main RF frequency components appear in total (FIG. 26).

When the output signal of quadrature modulator 5 having these RF frequency components is square-law detected by envelope detector 6, and is subsequently filtered by low pass filter 7 to extract a near DC component, the frequency component of ω0 is blocked by low pass filter 7. Therefore, a DC output of B^2/2 proportional to the square of the DC offset component appear in addition to the DC output of A^2 proportional to the square of amplitude A of the AC test signal (FIG. 27).

However, this DC output that is proportional to the DC offset component has a fixed value as long as the test signal is an AC signal. From this fact, the influence of the DC offset, which has a fixed value, is completely removed in comparing the outputs of low pass filter 7 when the two sets of test signals are generated, thus making it possible to compare only those components which are influenced by I/Q mismatches.

Accordingly, this exemplary embodiment can advantageously implement the compensation operations for I/Q mismatches as they are anticipated.

A second advantage of this exemplary embodiment lies in that a compensation operation for I/Q amplitude mismatch, which is not described in Patent Document 1, can be implemented for quadrature modulator 5 using simplified test signals of rectangular wave, triangular wave or the like in a manner similar to the method disclosed in Patent Document 1.

A third advantage of this exemplary embodiment will be described. While the conventional techniques employs smooth sinusoidal waves for test signals, the test signals are simplified into rectangular waves, triangular waves or the like in this exemplary embodiment, so that a smaller ROM area is simply provided for storing waveform data of the test signals.

A fourth advantage of this exemplary embodiment will be described. In this exemplary embodiment, the output values of low pass filter 7 are compared when two sets of test signals are generated. In this event, no AD converter need be used from the fact that only the magnitude relationship between values must be known, so that comparator 8 may be used to compare the magnitude relationship. Also, since the number of times that comparator 8 performs the comparison is only one for two sets of test signals, the sampling rate can be reduced when the output of low pass filter 7 is captured. As a result, comparator 8 can be configured in a readily implementable manner, and the degree of difficulty can be advantageously reduced for implementation.

A fifth advantage of this exemplary embodiment will be described. According to the flow chart shown in FIG. 14, a compensation operation for a DC offset is first executed for each I-component and each Q-component. However, as previously described, a DC offset remains to some degree even after the compensation operation for a DC offset has been performed, due to the problem of the resolution of DA converter 10. According to this exemplary embodiment, the compensation operations can be performed for an I/Q amplitude mismatch and an I/Q phase mismatch without being influenced by this residual DC offset.

In this regard, while this exemplary embodiment executes the compensation operations for the I/Q amplitude mismatch and I/Q phase mismatch after the compensation operation for the DC offset in the flow chart shown in FIG. 14 has been implemented, the present invention is not so limited. As described above, the compensation operation for I/Q phase mismatch and the compensation operation for I/Q amplitude mismatch according to this exemplary embodiment are not influenced by the residual DC offset. For this reason, the compensation operation for I/Q amplitude mismatch or the compensation operation for I/Q phase mismatch can be performed before the compensation operation for DC offset is performed.

Also, in this exemplary embodiment, all the compensation operations for DC offset, I/Q amplitude mismatch, and I/Q phase mismatch are executed in the flow chart shown in FIG. 14, but the present invention is not so limited. Specifically, when a radio communication scheme applied to a transmitter defines a loose standard value for a DC offset, the standard value can be achieved in some cases even without performing the compensation operation for DC offset. Also, the compensation operation for I/Q amplitude mismatch according to this exemplary embodiment is not influenced by a residual DC offset. Accordingly, an I/Q amplitude mismatch and an I/Q phase mismatch can be performed without performing the compensation operation for DC offset. Also, as another example, due to the configuration of the transmitter, an I/Q amplitude mismatch can be negligibly small even without performing the compensation operation. In this event, the compensation operation for I/Q phase mismatch can only be performed by not performing the compensation operation for I/Q amplitude mismatch. Further, as another example, a radio communication scheme applied to a transmitter may occasionally achieve a standard value even without performing a compensation operation for I/Q phase mismatch. In this event, the compensation operation for I/Q phase mismatch can be omitted.

Also, in this exemplary embodiment, both processing in the two flow charts of FIGS. 15 and 20 are performed independently of each other, but the present invention is not so limited. Specifically, the two flow charts of FIGS. 15 and 20 can be merged. Specifically, attempts of step 203 through steps 208, 209 in FIG. 15 can be executed alternately with attempts of step 303 through steps 308, 309 in FIG. 20. Also, the merged flow chart can further be merged with the processing of the compensation operation for DC offset according to the conventional technique.

Also, while this exemplary embodiment employs envelope detector 6 which has a square characteristic, the present invention is not so limited, and may employ one which has a power characteristic with a power number ranging from one to three. In particular, employed envelope detector 6 may preferably have a power characteristic with a power number of 1.5 to 2.5 when quadrature modulator 5 provides an output level in a range of −3 dB to +3 dB.

Also, while this exemplary embodiment employs envelope detector 6 which has a square characteristic, the present invention is not so limited, but may employ one which has a linear characteristic. In this event, envelope detector 6 is more susceptible to a residual DC offset in the compensation operations for I/Q phase mismatch and I/Q amplitude mismatch. However, even in this event, the influence of the residual DC offset is advantageously suppressed, for example, as compared with the method disclosed in Patent Document 1.

Also, in this exemplary embodiment, the amplitude of the 1-component of the test signal is adjusted in the flow chart of FIG. 15, but the present invention is not so limited. Specifically, in the flow chart of FIG. 15, the amplitude of the Q-component of the test signal can also be adjusted, or the amplitude of the I-component and Q-component of the test signal can simultaneously adjusted as well.

Second Exemplary Embodiment

Figure 28:
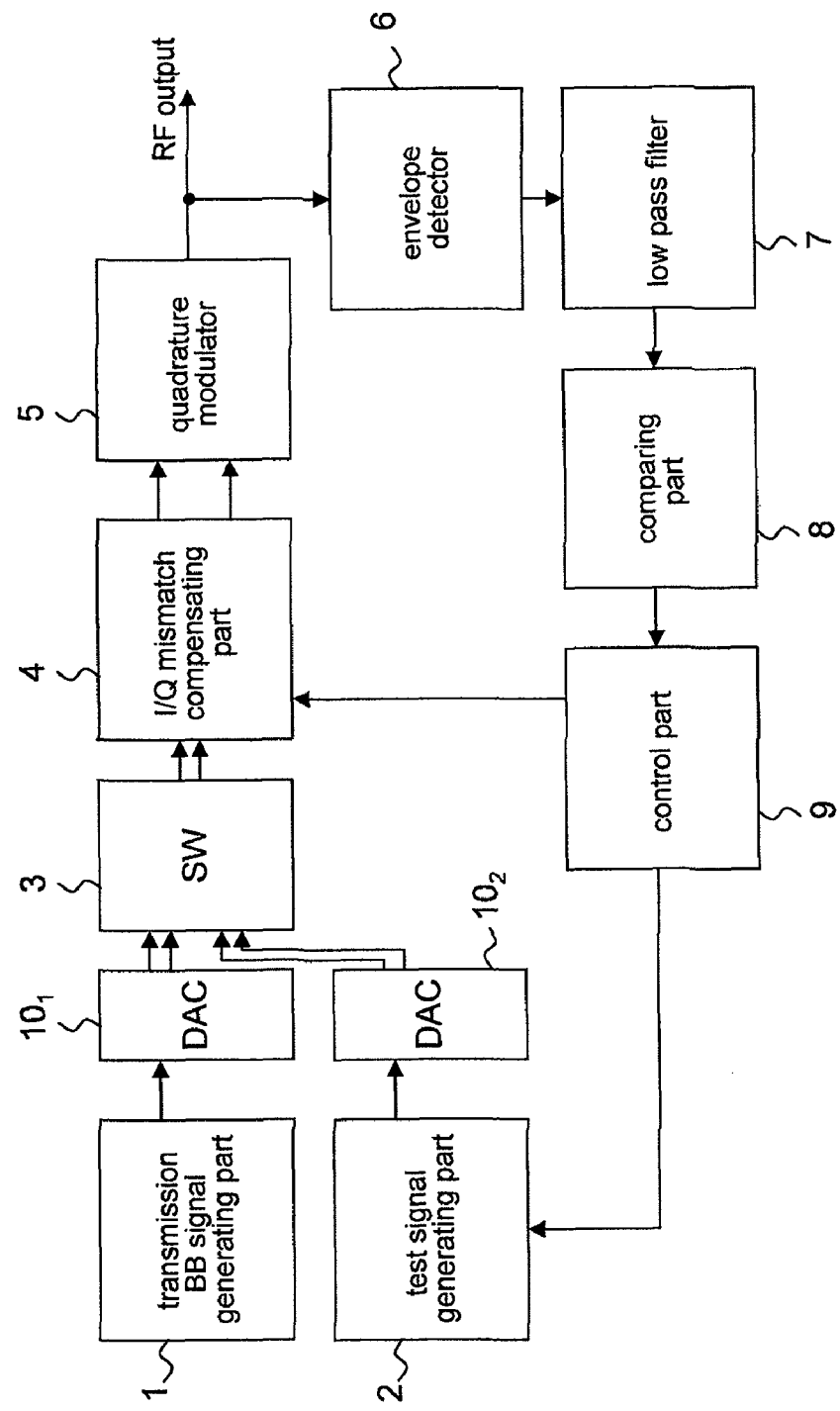
FIG. 28 is a block diagram showing the whole configuration of a signal processing circuit according to a second exemplary embodiment of the present invention.

FIG. 28 is a block diagram showing the whole configuration of a signal processing circuit according to a second exemplary embodiment of the present invention.

Referring to FIG. 28, the signal processing circuit of this exemplary embodiment differs, in comparison with the first exemplary embodiment in FIG. 10, in that I/Q mismatch compensating part 4 is preceded by DA converter $10_1$ for transmission BB signal generating part 1, and DA converter $10_2$ for test signal generating part 2, respectively, provided independently of each other. In other words, I/Q mismatch compensating part 4 performs I/Q mismatch compensations in an analog manner.

Switch 3 selects the output of DA converter 101 in a transmission operation, and selects the output of DA converter 102 in a compensation operation.

I/Q mismatch compensating part 4 selects the output of DA converter $10_1$ in a transmission operation, and selects the output of DA converter $10_2$ in a compensation operation.

In this exemplary embodiment, I/Q mismatch compensating part 4 can be advantageously simplified in circuit configuration, for example, as shown in FIG. 13, as compared with I/Q mismatch compensations which are implemented by digital product sum operations.

This exemplary embodiment is advantageous in that requirements for a transmission operation can be compatible with those for a compensation operation when the speed and resolution required for a D/converter in the transmission operation are largely distinct from the speed and resolution required for the DA converter in the compensation operation.

Specifically, when the transmission operation requires a DA converter which provides high speeds but low resolution, such a DA converter is assigned to DA converter $10_1$. On the other hand, when the compensation operation requires a DA converter which provides low speeds but high resolution, such a DA converter is assigned to DA converter 102. In this way, useless implementations can be avoided.

Third Exemplary Embodiment

Figure 29:
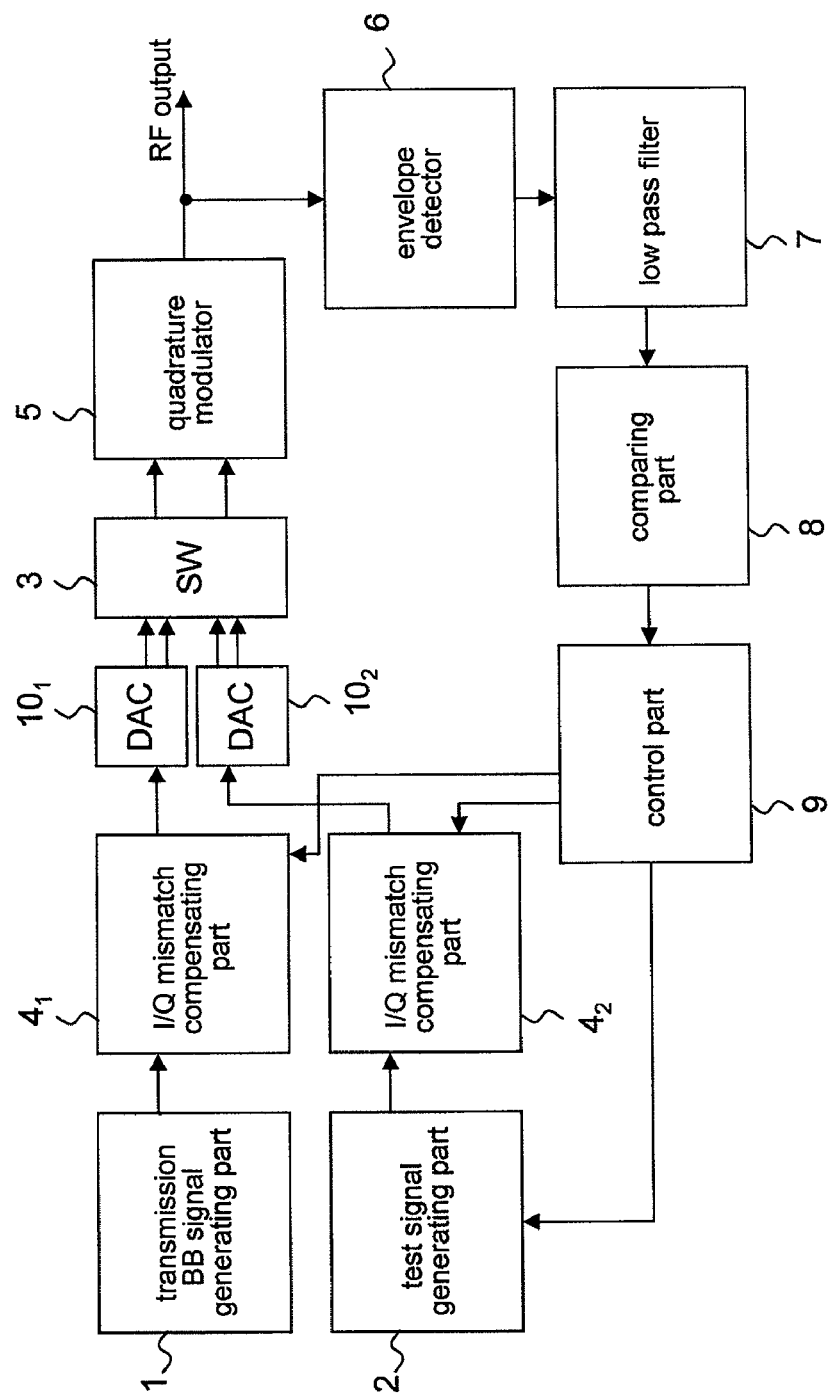
FIG. 29 is a block diagram showing the whole configuration of a signal processing circuit according to a third exemplary embodiment of the present invention.

FIG. 29 is a block diagram showing the whole configuration of a signal processing circuit according to a third exemplary embodiment of the present invention.

Referring to FIG. 29, the signal processing circuit of this exemplary embodiment differs, in comparison with the first exemplary embodiment in FIG. 10, in that a transmission baseband signal generated by transmission BB signal generating part 1 and test signals generated by test signal generating part 2 are applied to independent DA converters $10_1$, $10_2$ through independent I/Q mismatch compensating parts $4_1$, $4_2$, respectively.

This exemplary embodiment is advantageous in that requirements for a transmission operation can be compatible with those for a compensation operation when the speed and resolution required for a DA converter in the transmission operation are largely distinct from the speed and resolution required for the DA converter in the compensation operation.

In the following, a description will be given of the operation of the signal processing circuit of this exemplary embodiment.

Figure 30:
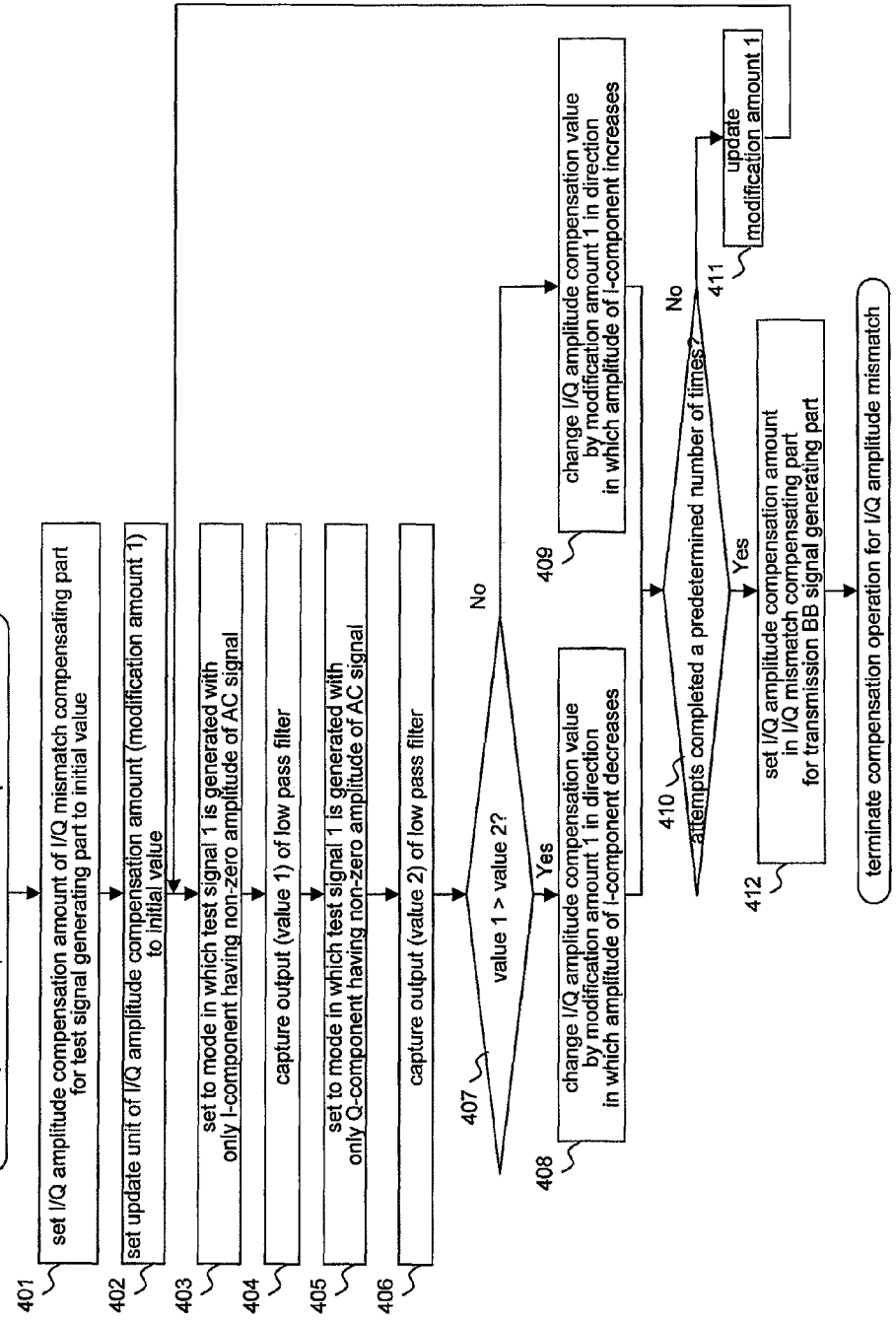
FIG. 30 is a flow chart for describing the compensation operation for I/Q amplitude mismatch by the signal processing circuit shown in FIG. 29.

FIG. 30 is a flow chart for describing a compensation operation for I/Q amplitude mismatch by the signal processing circuit shown in FIG. 29.

Referring to FIG. 30, an I/Q amplitude compensation amount is set in I/Q mismatch compensating part $4_2$ for test signal generating part 2 through processing at step 401 through step 411 similar to step 201 through step 211 in FIG. 15.

When attempts of steps 403~408, 409 have been made a predetermined number of times, control part 9 sets the I/Q amplitude compensation amount that has been set in I/Q mismatch compensating part $4_2$ for test signal generating part 2 at that time in I/Q mismatch compensating part $4_1$ for transmission BB signal generating part 1 (step 412).

By now, the compensation operation for I/Q amplitude mismatch is completed.

Figure 31:
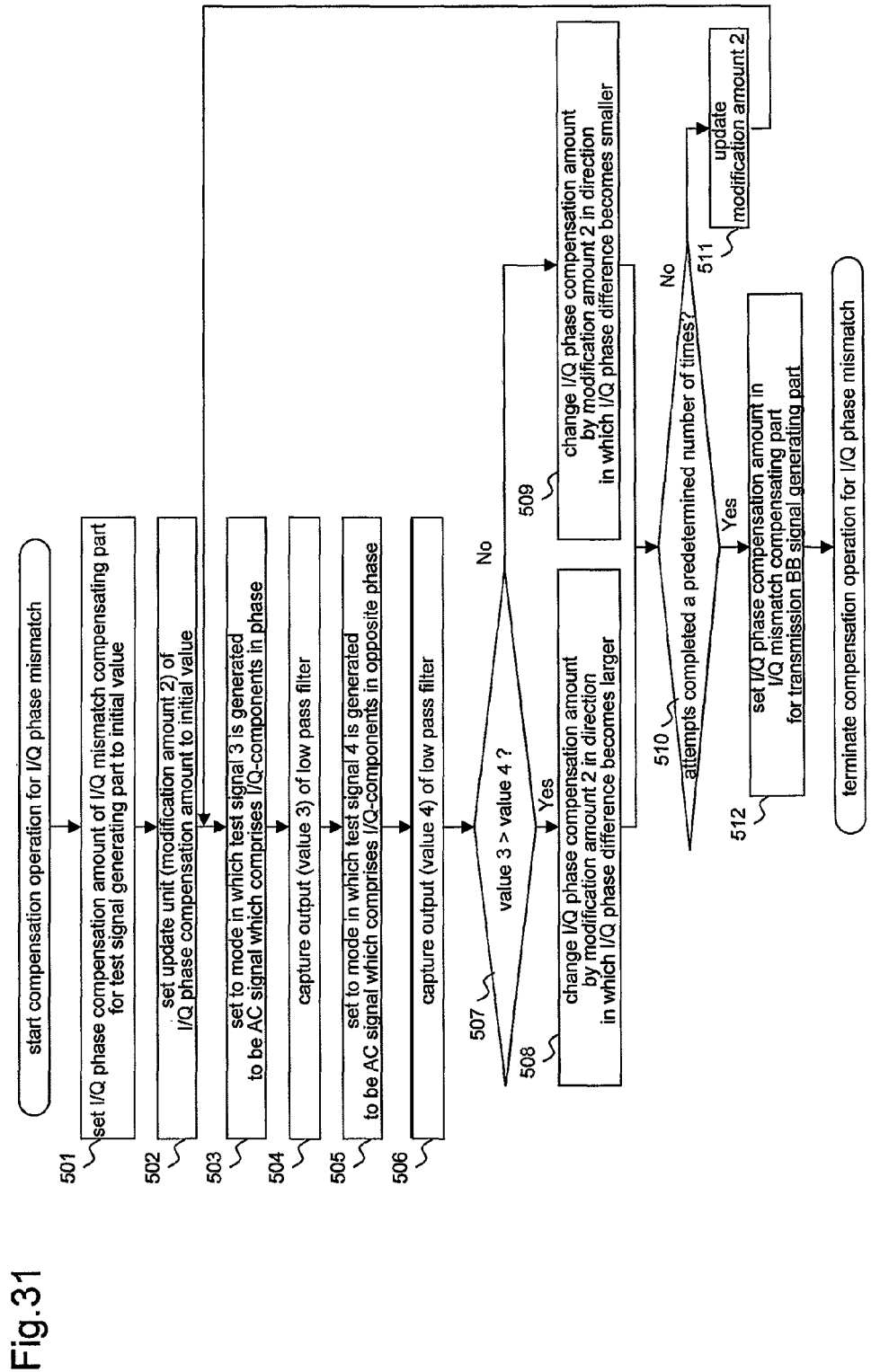
FIG. 31 is a flow chart for describing the compensation operation for I/Q phase mismatch by the signal processing circuit shown in FIG. 29.

FIG. 31 is a flow chart for describing the compensation operation for I/Q phase mismatch by the signal processing circuit shown in FIG. 29.

Referring to FIG. 31, an I/Q phase compensation amount is set in I/Q mismatch compensating part $4_2$ for test signal generating part 2 through processing at step 501 through step 511 similar to step 301 through step 311 in FIG. 20.

When attempts of steps 503~508, 509 have been made a predetermined number of times, control part 9 sets the I/Q phase compensation amount that has been set in I/Q mismatch compensating part $4_2$ for test signal generating part 2 at that time to I/Q mismatch compensating part $4_1$ for transmission BB signal generating part 1 (step 512).

By now, the compensation operation for I/Q phase mismatch is completed.

Fourth Exemplary Embodiment

Figure 32:
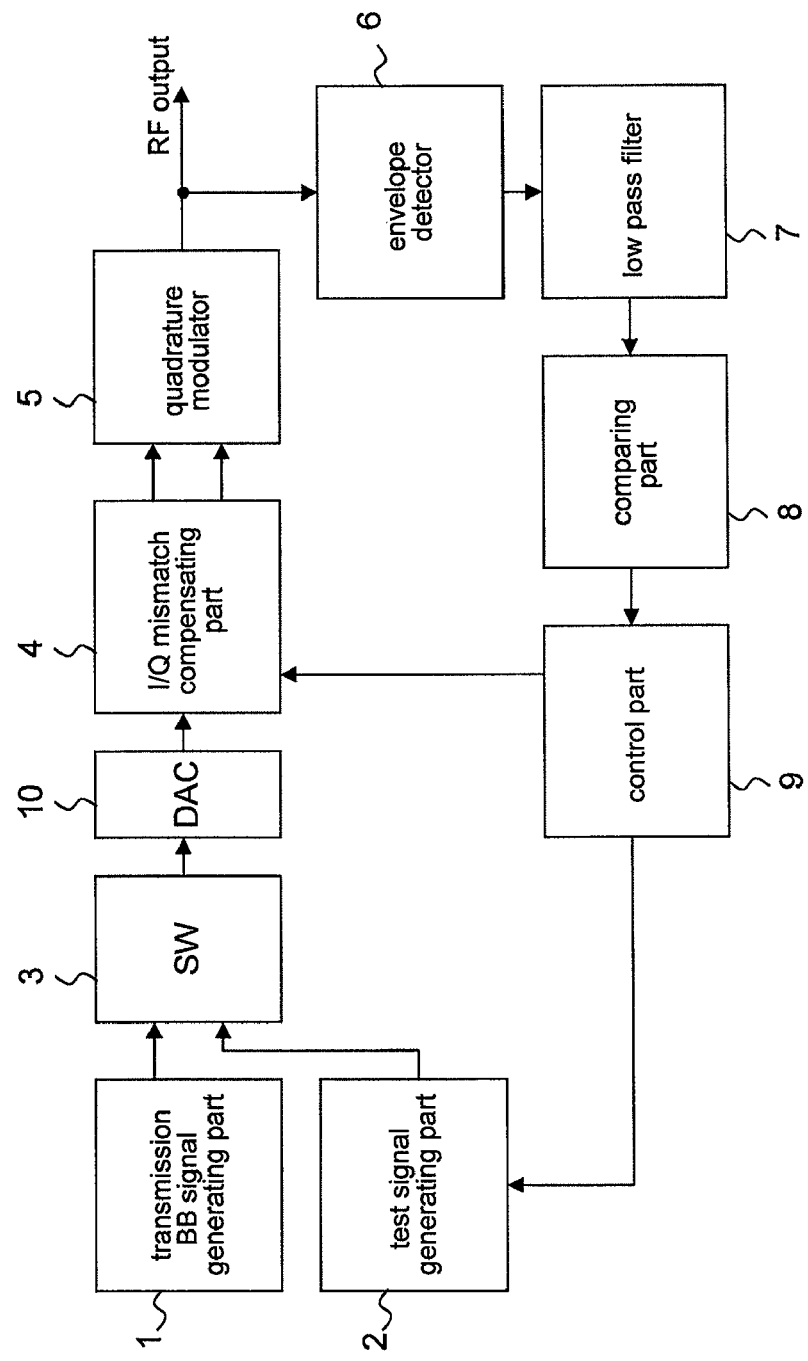
FIG. 32 is a block diagram showing the entire configuration of a signal processing circuit according to a fourth exemplary embodiment of the present invention.

FIG. 32 is a block diagram showing the whole configuration of a signal processing circuit according to a fourth exemplary embodiment of the present invention.

Referring to FIG. 32, the signal processing circuit of this exemplary embodiment differs, in comparison with the first exemplary embodiment in FIG. 10, in that I/Q mismatch compensating part 4 is preceded by DA converter 10. In other words, I/Q mismatch compensating part 4 performs I/Q mismatch compensations in an analog manner.

In this exemplary embodiment, the circuit configuration of I/Q mismatch compensating part 4 can be advantageously simplified, for example, as shown in FIG. 13, as compared with I/Q mismatch compensations which are implemented by digital product sum operations.

The invention claimed is:

1. A signal processing circuit for compensating a quadrature modulator for an in-phase/quadrature (I/Q) amplitude mismatch which involves mismatching amplitudes of I/Q-components of an output signal from said quadrature modulator, and for an I/Q phase mismatch which involves a deviation from 90 degrees of a phase difference between the I/Q-components of the output signal from said quadrature modulator, said signal processing circuit comprising:

an I/Q mismatch compensating part for correcting an input signal for amplitude or phase, based on a compensation amount for compensating for the I/Q amplitude mismatch or the I/Q phase mismatch, and applying the input signal with the corrected amplitude or phase to said quadrature modulator;

a test signal generating part for sequentially generating two sets of combinations of I/Q-components of test signals which are alternating current (AC) signals and applying the test signals to said I/Q mismatch compensating part;

a detector for detecting the amplitude of an envelope of an output signal from said quadrature modulator, wherein said detector outputs a signal proportional to first to third power of the amplitude of the envelope of the output signal from said quadrature modulator;

a filter for passing therethrough a signal at a cutoff frequency or lower within the output signal from said detector; and a control part for deriving a compensation amount for the amplitude or phase of said I/Q mismatch compensating part such that output values of said filter are equal when the two sets of test signals are respectively generated, and setting the compensation amount in said I/Q mismatch compensating part; wherein:

said test signal generating part sequentially generates a first test signal which comprises an in phase component (I-component) that is an AC signal having a first amplitude value, and a quadrature component (Q-component) that is an AC signal in phase with the I-component and having a second amplitude value, and generates a second test signal which comprises an Q-component that is an AC signal having the first amplitude value, and an I-component that is an AC signal in opposite phase with the Q-component and having the second amplitude value;

said control part derives the compensation amount such that output value 1 of said filter when the first test signal is generated is equal to output value 2 of said filter when the second test signal is generated; and said detector outputs a signal proportional to 1.5th to 2.5th power of the amplitude of the envelope of the output signal from said quadrature modulator when the output level of the output signal of said quadrature modulator is in a range of −3 dB to +3 dB.

2. The signal processing circuit according to claim 1, wherein:

said control part adjusts the amplitude or phase of the test signals based on the magnitude relationship between the output values when the two sets of test signals are respectively generated, and derives the compensation amount based on the adjustment result.

3. The signal processing circuit according to claim 1, wherein:

said control part performs a repeated operation for deriving a new correction amount by adding or subtracting a predetermined modification amount to or from the compensation amount based on the magnitude relationship between output value 1 and output value 2, and setting the new correction amount in said I/Q mismatch compensating part a predetermined number of times, and updates the modification amount each time the repeated operation is performed.

4. The signal processing circuit according to claim 3, wherein:

said test signal generating part sets the second amplitude value to zero, and said control part derives a compensation amount for the amplitude of said I/Q mismatch compensating part by performing the repeated operation a predetermined number of times.

5. The signal processing circuit according to claim 3, wherein:

said test signal generating part makes the first and second amplitude values equal, and said control part derives a compensation amount for the phase of said I/Q mismatch compensating part by performing the repeated operation a predetermined number of times.

6. The signal processing circuit according to claim 3, wherein:

said test signal generating part sets the second amplitude value to zero, said control part derives a compensation amount for the amplitude of said I/Q mismatch compensating part by performing the repeated operation a predetermined number of times, said test signal generating part subsequently makes the first and second amplitude values equal, and said control part derives a compensation amount for the phase of said I/Q mismatch compensating part by again performing the repeated operation a predetermined number of times.

7. The signal processing circuit according to claim 1, further comprising:

a switch applied with a transmission baseband signal and test signals generated by said test signal generating part for selecting one of the applied signals, and supplying the selected one to said I/Q mismatch compensating part.

8. The signal processing circuit according to claim 1, wherein:

said I/Q mismatch compensating part performs I/Q mismatch compensation to correct an input signal for the amplitude or phase through digital processing.

9. The signal processing circuit according to claim 1, wherein:

said I/Q mismatch compensating part performs an I/Q mismatch compensation to correct an input signal for the amplitude or phase through analog processing.

10. The signal processing circuit according to claim 1, further comprising:

means for compensating said quadrature modulator for a DC offset, wherein said control part performs a compensation operation for I/Q amplitude mismatch or I/Q phase mismatch after a compensation operation for the DC offset is performed for said quadrature modulator.

11. The signal processing circuit according to claim 1, wherein:
said cutoff frequency of said filter is equal to or lower than a frequency twice the AC signal which is the test signal.

12. The signal processing circuit according to claim 1, wherein:
said cutoff frequency of said filter is equal to or lower than the frequency of the AC signal which is the test signal.

13. A signal processing method for compensating a quadrature modulator for an in-phase/quadrature (I/Q) amplitude mismatch which involves mismatching amplitudes of I/Q-components of an output signal from said quadrature modulator, and for an I/Q phase mismatch which involves a deviation from 90 degrees of a phase difference between the I/Q-components of the output signal from said quadrature modulator, said method comprising:
an I/Q mismatch compensating part correcting an input signal for amplitude or phase, based on a compensation amount for compensating for the I/Q amplitude mismatch or the I/Q phase mismatch, and applying the input signal with the corrected amplitude or phase to said quadrature modulator;
a test signal generating part sequentially generating two sets of combinations of I/Q-components of test signals which alternating current (AC) AC signals and applying the test signals to said I/Q mismatch compensating part;
a detector detecting the amplitude of an envelope of an output signal from said quadrature modulator, wherein said detector outputs a signal proportional to first to third power of the amplitude of the envelope of the output signal from said quadrature modulator;
a filter passing therethrough a signal at a cutoff frequency or lower within the output signal from said detector; and
a control part deriving a compensation amount for the amplitude or phase of said I/Q mismatch compensating part such that output values of said filter are equal when the two sets of test signals are respectively generated, and setting the compensation amount in said I/Q mismatch compensating part; wherein:
said test signal generating part sequentially generates a first test signal which comprises an in-phase component (I-component) that is an AC signal having a first amplitude value, and a quadrature component (Q-component) that is an AC signal in phase with the I-component and having a second amplitude value, and generates a second test signal which comprises an Q-component that is an AC signal having the first amplitude value, and an I-component that is an AC signal in opposite phase with the Q-component and having the second amplitude value;
said control part derives the compensation amount such that output value 1 of said filter when the first test signal is generated is equal to output value 2 of said filter when the second test signal is generated; and
said detector outputs a signal proportional to 1.5th to 2.5th power of the amplitude of the envelope of the output signal from said quadrature modulator when the output level of the output signal of said quadrature modulator is in a range of −3 dB to +3 dB.

* * * * *

UNITED STATES PATENT AND TRADEMARK OFFICE
CERTIFICATE OF CORRECTION

PATENT NO. : 8,385,458 B2  Page 1 of 1
APPLICATION NO. : 12/376415
DATED : February 26, 2013
INVENTOR(S) : Kiyoshi Yanagisawa and Noriaki Matsuno It is certified that error appears in the above-identified patent and that said Letters Patent is hereby corrected as shown below:

In the Specification

Column 2, Line 43: Delete "ND" and insert -- A/D --

Column 2, Line 48: Delete "ND" and insert -- A/D --

Column 19, Line 24: Delete "1" and insert -- I --

Column 19, Line 46: Delete "101" and insert -- $10_1$ --

Column 19, Line 47: Delete "102" and insert -- $10_2$ --

Column 20, Line 1: Delete "102." and insert -- $10_2$ --

In the Claims

Column 21, Line 42: Claim 1, delete "in phase" and insert -- in-phase --

Column 23, Line 25: Claim 13, after "which" insert -- are --

Column 23, Line 25: Claim 13, after "(AC)" delete "AC"

Signed and Sealed this
Twenty-first Day of October, 2014

Michelle K. Lee
*Deputy Director of the United States Patent and Trademark Office*